US012129998B1

(12) United States Patent
Wang

(10) Patent No.: US 12,129,998 B1
(45) Date of Patent: Oct. 29, 2024

(54) CONNECTABLE LAMP

(71) Applicant: Wangs Alliance Corporation, Port Washington, NY (US)

(72) Inventor: David Xin Wang, Great Neck, NY (US)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 18/407,731

(22) Filed: Jan. 9, 2024

Related U.S. Application Data

(60) Provisional application No. 63/528,485, filed on Jul. 24, 2023.

(51) Int. Cl.

| | |
|---|---|
| ***F21V 23/06*** | (2006.01) |
| ***F21S 8/00*** | (2006.01) |
| ***F21V 3/06*** | (2018.01) |
| ***F21V 21/02*** | (2006.01) |
| *F21Y 103/10* | (2016.01) |
| *F21Y 103/33* | (2016.01) |
| *F21Y 115/10* | (2016.01) |

(52) U.S. Cl.
CPC ................ *F21V 23/06* (2013.01); *F21S 8/03* (2013.01); *F21V 3/0625* (2018.02); *F21V 21/02* (2013.01); *F21Y 2103/10* (2016.08); *F21Y 2103/33* (2016.08); *F21Y 2115/10* (2016.08)

(58) Field of Classification Search
CPC ........ F21V 23/06; F21V 3/0625; F21V 21/02; F21S 8/03; F21Y 2103/10; F21Y 2103/33; F21Y 2115/10
See application file for complete search history.

(56) References Cited

U.S. PATENT DOCUMENTS

| | | | | |
|---|---|---|---|---|
| 6,884,103 B1 * | 4/2005 | Kovacs | H01R 33/08 439/336 |
| 7,530,833 B1 * | 5/2009 | Yang | H01R 4/54 439/337 |
| 2010/0096965 A1 * | 4/2010 | Oyaizu | F21V 3/12 313/1 |

(Continued)

OTHER PUBLICATIONS

"9-Watt LED Luminaires, Product Data Sheet," Engineered Products Company, Feb. 2023.

(Continued)

*Primary Examiner* — Evan P Dzierzynski
(74) *Attorney, Agent, or Firm* — Weiss & Arons LLP

(57) ABSTRACT

A connectable lamp may be configured to be mounted to a surface. The lamp may include a light source, an enclosure configured to support the light source, and electrical connectors and stability connectors that extend from the enclosure. The stability connectors may be disposed radially outward from the electrical connectors. The electrical and stability connectors may be aligned in a row or may be positioned transversely to one another. The electrical and stability connectors may be configured such that, after insertion of the electrical connectors and the stability connectors into receptacles in a mounting support that may be fixed to the surface, rotation of the connectors about a central axis defined by the enclosure may engage the electrical connectors with power terminals. The receptacles may include arcuate slots in the mounting support.

29 Claims, 32 Drawing Sheets

(56) References Cited

U.S. PATENT DOCUMENTS

| | | | | |
|---|---|---|---|---|
| 2011/0063837 | A1* | 3/2011 | Rizkin | F21V 29/70 362/249.02 |
| 2011/0164424 | A1* | 7/2011 | Breen, IV | H01R 4/4821 362/373 |
| 2016/0073479 | A1* | 3/2016 | Erchak | F21V 23/009 315/51 |
| 2019/0049081 | A1* | 2/2019 | Chen | F21V 19/003 |
| 2020/0059016 | A1* | 2/2020 | Kimmel | H01R 13/26 |
| 2021/0359475 | A1* | 11/2021 | Mostoller | H05B 47/11 |
| 2021/0384669 | A1* | 12/2021 | Mugan | F21V 17/02 |
| 2024/0068646 | A1* | 2/2024 | Rizzo | F21V 21/02 |

OTHER PUBLICATIONS

Photos of Box and Contents of "GU24 LED Lamp Holder, Keyless Part No. 16531 (9 pages of photos)," Engineered Products Company, 2017.

* cited by examiner

CONNECTABLE LAMP

CROSS-REFERENCE TO RELATED APPLICATION

This is a nonprovisional application of U.S. Provisional Application No. 63/528,485, filed Jul. 24, 2023, which is hereby incorporated by reference herein in its entirety.

BACKGROUND

A lamp may be connected to a surface, such as a ceiling or wall, using one or more electrical connectors on the lamp. The electrical connectors may be designed to hold a lamp, but the lamp may not be supportable if its weight exceeds the weight capacity of its electrical connectors. It may be desirable therefore to configure a lamp and a mounting support for the lamp to be mountable to a surface and withstand a lamp weight that exceeds the weight capacity of the electrical connectors.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
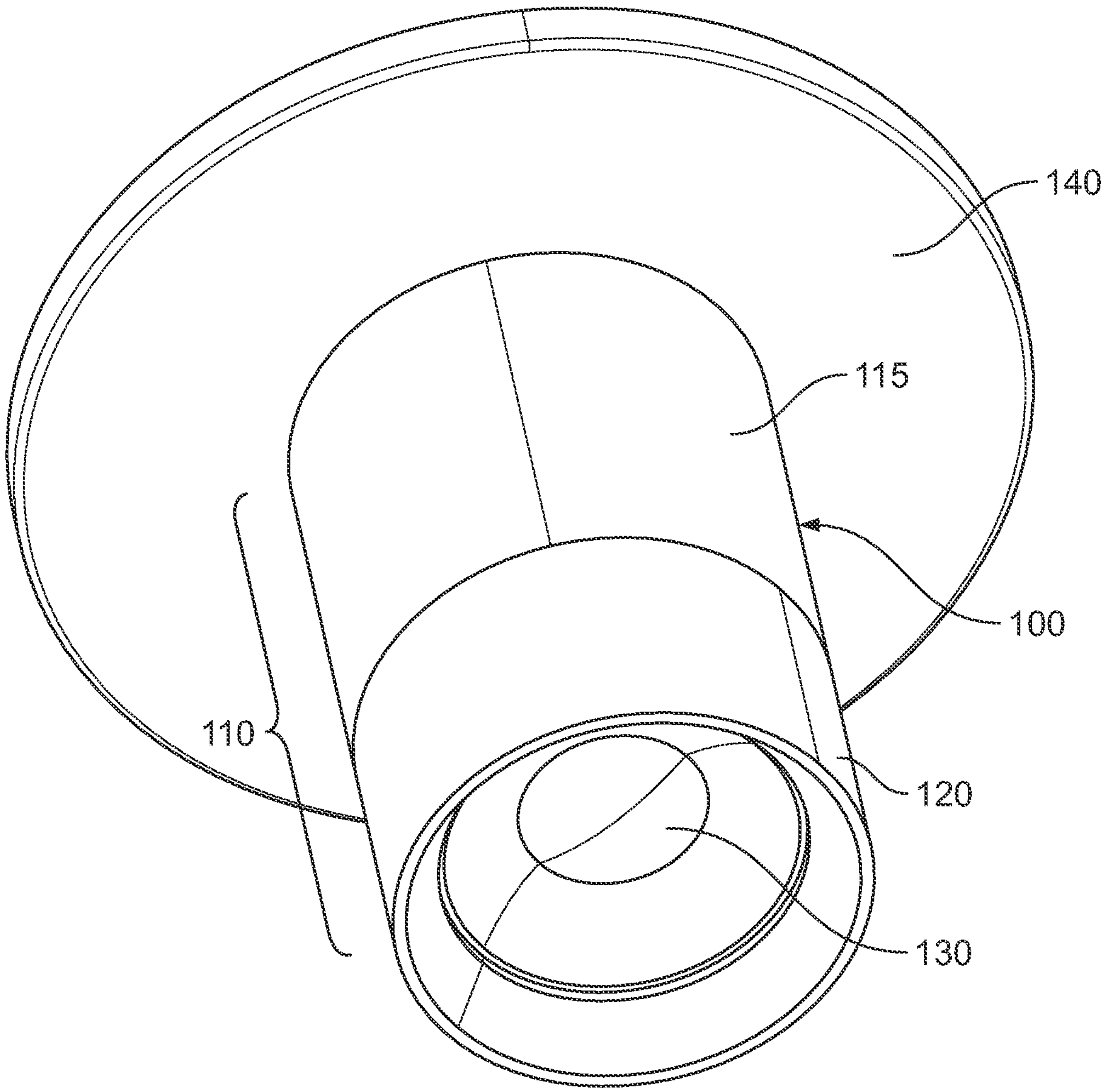
FIG. 1 shows a perspective view of an illustrative lamp mounted to an illustrative mounting support in accordance with principles of the invention.

Apparatus and methods for providing lighting through a connectable lamp are provided. The configuration of the connectable lamp may permit a lamp that exceeds a weight capacity of electrical connectors to be supported on a surface and may simplify installation of the lamp.

A connectable lamp may be configured to be mounted to a surface. A mounting support may be mounted to the surface and the lamp may be mounted to the mounting support. The mounting support may be anchored to a junction box that may be recessed within a portion of the surface. The lamp may include a light source. The lamp may include an enclosure that is configured to support the light source. The enclosure may define a central axis. Electrical connectors and stability connectors may extend from the enclosure. The stability connectors may be disposed radially outward from the electrical connectors. The stability connectors may be disposed radially inward from the electrical connectors.

The electrical connectors and the stability connectors may be configured such that, after insertion of the electrical connectors and the stability connectors into receptacles fixed to the surface, rotation of the electrical connectors and the stability connectors about the central axis engages the electrical connectors with power terminals and the stability connectors with a mounting support fixed to the surface. The mounting support may include the power terminals. The receptacles may define first slots. One or more of the slots may be arcuate. Each of the first slots may be configured to receive and removably retain a corresponding one of the electrical connectors. The first slots may be spring-loaded to removably retain the electrical connectors after the enclosure is rotated into engagement with the mounting support.

The mounting support may include a first plate. The receptacles may define second slots in the plate. One or more of the slots may be arcuate. Each of the second slots may be configured to receive and removably retain a respective one of the stability connectors. The plate may be configured as a canopy.

The enclosure may be configured to be mounted to the surface by inserting the electrical connectors into the first slots and the stability connectors into the second slots. The enclosure may be further configured to be mounted by rotating the enclosure so that the electrical connectors are retained in the first slots, and the stability connectors are retained in the second slots. The electrical connectors and the stability connectors may be configured to be inserted into the first and second slots, respectively, at the same time. The electrical connectors may be configured to be inserted into the first slots, and the stability connectors may be configured to be inserted into the second slots after the electrical connectors are inserted into the second slots.

The connectable lamp may include the mounting support. The mounting support may include a second plate mounted above the first plate. The second plate may be configured to reduce flexing of the first plate when the enclosure is mounted to the mounting support.

The electrical connectors may be configured to support a first weight of the connectable lamp when the connected lamp is mounted to the surface. The stability connectors in combination with the electrical connectors may be configured to support a second weight of the connectable lamp that is greater than the first weight. The first weight may be a first predetermined maximum weight that may be supported by the electrical connectors. The second weight may be a predetermined maximum weight that may be supported by the combination of the electrical connectors and the stability connectors.

In some embodiments, the electrical connectors and the stability connectors may be aligned in a row. The stability connectors may be spaced away from the electrical connectors across the central axis. In some embodiments, the electrical connectors may be aligned in a first row, and the stability connectors may be aligned in a second row. The second row may be perpendicular to the first row.

The electrical connectors may extend to a first elevation above the enclosure. The stability connectors may extend to a second elevation above the enclosure. The second elevation may, in operation, be lower than the first elevation.

The stability connectors may be connectors that do not provide electrical power to the light source, i.e., when the lamp is operational.

Each of the electrical connectors may define a first longitudinal cross-sectional outline. Each of the stability connectors may define a second longitudinal cross-sectional outline. The first and second longitudinal cross-sectional outlines may be the same. The electrical connectors may be GU10 connectors. The electrical connectors may be GU24 connectors.

The first and second longitudinal cross-sectional outlines may be different.

The light source may include a light emitting diode ("LED") light source. The light source may be dimmable. The lamp may be a downlight. The light source may be housed within the enclosure.

The connectable lamp may include a frosted cover that provides diffusion to light emitted from the light source in the lamp. The connectable lamp may include a translucent cover. The frosted cover may be disposed between the light source and the translucent cover.

The enclosure of the connectable lamp may be configured to be mounted flush with the surface. The enclosure may have a diameter that in operation is parallel to the surface. The enclosure may have a depth that in operation extends away from the surface. The diameter of the enclosure may be greater than the depth of the enclosure.

The light source may include a circular array of light emitting diodes.

The light source may be configured to be suspended from the enclosure by a cable that provides power to the light source. When the enclosure is a first enclosure, the lamp may include a second enclosure. The first enclosure may be disposed, operationally, at a top of the lamp. The top of the lamp may be configured to be mounted to the surface. The second enclosure may house the light source. The second enclosure may be connected to the light source. The second enclosure may be disposed at a position that is spaced apart from the first enclosure. The second enclosure may be configured to be suspended from the first enclosure by a cable that provides power to the light source.

The lamp may include an elongated substrate. The light source may include an array of light emitting diodes, and the array may be disposed on the elongated substrate.

In some embodiments, the apparatus may include an enclosure that includes a lamp and a base that is connectable to the lamp. The base may include an upper section of the enclosure above a lamp section from which light may be output. The base may include electrical connections that may be configured as electrical connectors. The base may include GU10 electrical connections. The base may include GU24 electrical connections. The GU10 electrical connections may include 2 pins spaced 10 mm apart. The GU24 electrical connections may include 2 pins spaced 24 mm apart. The base may include stability connections. The stability connections may include stability connectors. Stability connectors may include stability pins. The stability pins may include at least 2 pins. The stability pins may be pins that do not provide an electrical connection. The stability pins may provide an electrical connection.

The apparatus may be manufactured with the electrical connections and the stability connections. The apparatus may be manufactured with the electrical connections and may be retrofitted to include the stability connections.

Underwriters Laboratories ("UL") tests products for fire safety and electrical safety. A UL label indicates the product has passed the specific safety requirements necessary to be used by a consumer. Current UL listed weight for a GU10 or GU24 electrical connectors is 5 pounds. The stability connectors may increase the strength of the connection between the apparatus and a mounted canopy. The increased strength of the connection may allow for the weight of the apparatus to be greater than 5 pounds. For example, if GU10 connectors are used for stability connectors, the strength of the connection between the lamp and mounted canopy may be increased by an additional 5 pounds to a total of 10 pounds. The increased strength of the connection may allow for larger ornamental apparatuses to be installed.

The lamp may include an LED. The lamp may include a plurality of LEDs. The LEDs may include one color. The LEDs may include a plurality of colors. The LEDs may include one correlated color temperature ("CCT"). The LEDs may include a plurality of CCTs. The LEDs may be in electrical communication with the electrical connections.

The lamp may be integral with the base. The lamp may be removably attached to the base. The removable attachment may include: a threaded connection, a clip connection, a friction fit connection and/or any other suitable connection. The lamp may be attached to the base through a down rod. The lamp may be rotatably attached to the base. The lamp may be rotated with respect to the base.

The apparatus may connect to a mounted canopy. The canopy may be mounted to a ceiling or wall. The canopy may be electrically connected to a power source through lead wires. The canopy may be electrically connected to an electrical junction box. An outer surface of a base of the apparatus may be removably attached to the canopy. The base may connect to the canopy with the electrical connections. The base may connect to the canopy with the stability connections. The base may connect to the canopy with both the electrical connections and the stability connections.

The canopy may include a hub, a plate and a bracket. The hub may be removably attached to the electrical connections. The plate may be removably attached to the stability connections. The bracket may be securely attached to a ceiling or wall to mount the canopy to the ceiling or wall. The hub may be electrically connected to a power source through lead wires. The hub may be secured to the bracket through screws and/or any other suitable connection. The plate may be secured to the bracket through screws and/or any other suitable connection. The plate may be secured to the hub. The plate may be only secured to the hub through the bracket. An existing hub may be retrofitted to include the plate in order to be able to attach to the apparatus.

Each of the 2 pins of the GU10 or GU24 electrical connection may include a cylindrical stem with one end attached to the outer surface of the base and a cylindrical top attached to the second end of the cylindrical stem. The diameter of the cylindrical top may be larger than a diameter of the cylindrical stem.

Each of the at least 2 pins of the stability connections may include a cylindrical stem with one end attached to the outer surface of the base and a cylindrical top attached to the second end of the cylindrical stem. The diameter of the cylindrical top may be larger than a diameter of the cylindrical stem.

The base may include an attachment side. The attachment side may have a flat surface. The attachment side may have a tiered surface. The tiered surface may include a central inner circular surface spaced above an annular surface surrounding the inner circular surface. The pins of the electrical and stability connections may be placed on the same surface or different surfaces. The 2 pins of the electrical connection may be placed on the inner circular surface. The at least 2 pins of the stability connection may be placed on the annular surface. The pins may be placed symmetrically around each respective surface. The pins may be placed asymmetrically around each respective surface.

The diameter and height of each of the cylindrical tops of each of the electrical connection pins and each of the stability connection pins may be the same. The diameter and height of each of the cylindrical tops of each of the electrical connection pins and each of the stability connection pins may be different.

The diameter and height of each of the cylindrical stems of each of the electrical connection pins and each of the stability connection pins may be the same. The diameter and height of each of the cylindrical stems of each of the electrical connection pins and each of the stability connection pins may be different.

The hub of the canopy may include recesses. The hub may include a large cylindrical recess sized to fit the diameter and height of the central inner circular surface of the base. The hub may include recesses sized to fit pins. Each recess may include a hole sized to fit a respective diameter of a respective cylindrical top and the height of both the cylindrical top and the cylindrical stem. The recess may include a large arcuate slot sized to fit a height and diameter of the respective cylindrical top. The recess may include a small arcuate slot sized to fit a height and diameter of the respective cylindrical stem. The hole may be positioned on an outer surface of the hub of the canopy. The arcuate slots may have the same radius of curvature. The arcuate slots may extend from the hole. The arcuate slots may be aligned on top of each other with the small arcuate slot positioned central to the large arcuate slot. The large arcuate slot may be positioned within the hub of the canopy. The small arcuate slot may be positioned on the outer surface of the hub.

The plate of the canopy may include recesses. The recesses may include a hole and an arcuate slot. The plate may include a cavity within the plate. The cavity may have a height greater than a height of a respective cylindrical top and stem. The hole may be sized to fit a respective diameter of a respective cylindrical top. The arcuate slot may be sized to a diameter of a respective cylindrical stem.

The recesses may be sized to respective pins of the electrical connections and the stability connections. The arcuate slots of the recesses for the pins of the electrical connection may be in a different plane than the arcuate slots of the recesses for the pins of the stability connection. The slots of the recesses for the pins of the electrical connection may have a different radius of curvature than the slots of the recesses for the pins of the stability connection.

Respective pins of the apparatus may be inserted into respective holes in the canopy so that the respective cylindrical tops align with the respective large arcuate slots of the recesses and/or cavity and the respective cylindrical stems align with the respective small arcuate slots of the recesses. The apparatus may then be rotated so that the respective cylindrical tops fully enter the respective large arcuate slots and/or cavity and the respective cylindrical stems fully enter the respective small arcuate slots. When the respective pins are fully within the respective slots, the larger diameter of the cylindrical tops prevent the cylindrical tops from being withdrawn through the small arcuate slots. When the pins are fully within the slots, the apparatus is securely and removably attached to the canopy. The arcuate slots and/or cavity may each include clips, ribs, catches and/or latches to mechanically lock the pins in place.

The lamp may be removed by rotating the lamp to align the cylindrical tops and stems with the holes and pulling the lamp out of the holes.

The recesses may include clips, ribs, catches and/or latches that mechanically lock the pins in place.

Once the canopy is installed the lamp may be removably attached to the canopy. The lamp may be replaced with a new or different apparatus by removing the original apparatus. Removing and installing a new lamp may be as simple as replacing a light bulb.

The lamp may include a switch. The lamp may include a plurality of switches. The switches may be disposed on the base. The switches may be disposed on the lamp. One of the plurality of switches may adjust a color of the LEDs. One of the plurality of switches may adjust a CCT of the LEDs. One of the plurality of switches may power on or power off the LEDs.

Illustrative embodiments of apparatus and methods in accordance with the principles of the invention will now be described with reference to FIGS. 1-32, which form a part hereof. It is to be understood that other embodiments may be utilized and that structural, functional and procedural modifications or omissions may be made without departing from the scope and spirit of the present invention.

FIG. 1 shows a perspective view of a first illustrative lamp 100 that may be configured in accordance with principles of the invention. Lamp 100 may include a light source. Lamp 100 may include enclosure 110 that may support the light source. The light source may be housed within enclosure 110. Enclosure 110 may include upper section 115 and lower section 120 that are assembled together. Lamp 100 may be a downlight that projects light from a light source out of the bottom 130 of enclosure 110. The bottom 130 of enclosure 110 may be recessed inward into enclosure 110, such as in a conical shape. Lamp 100 may be configured to be mounted to a surface, such as a ceiling or wall. The mounting of lamp 100 may utilize mounting support 140 that is first mounted the surface. Lamp 100 may be mounted to mounting support 140. An electrical junction box (not shown) may be recessed within the surface and connected to mounting support 140 to provide power to lamp 100 when lamp 100 is connected to mounting support 140.

Figure 2:
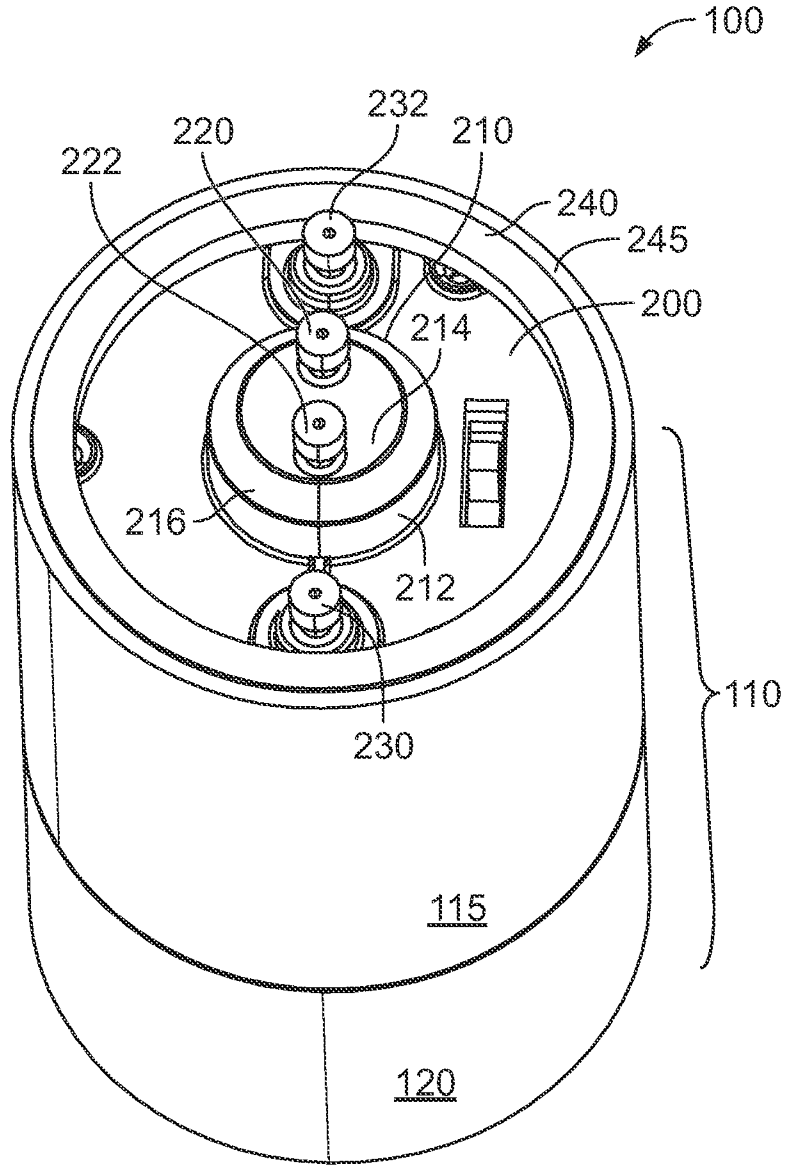
FIG. 2 shows a perspective view from above of a first embodiment of an illustrative lamp of FIG. 1 in accordance with principles of the invention.

FIG. 2 shows details of upper surface 200 of enclosure 110 in accordance with principles of the invention. Two or more electrical connectors 220, 222 may extend from enclosure 110. Electrical connectors 220, 222 may each be configured to connect to a power supply via mounting support 140 to power a light source (described below) within enclosure 110.

Upper surface 200 of enclosure 110 may have raised center chamber 210 in the form of a cylindrical outer surface. Chamber 210 may include outer wall 212. Chamber 210 may include upper surface 214 that is raised above upper surface 200 of enclosure 110. Chamber 210 may include chamfered ring portion 216 that may extend between the top of outer wall 212 and the side of upper surface 214. Electrical connectors 220, 222 may protrude from upper surface 214 of chamber 210.

Electrical connectors 220, 222 may include upper ends that are visible above chamber 210 and lower ends that are anchored within chamber 210. Electrical connectors 220, 222 may include, for example, connectors that are GU10 connectors or GU24 connectors. Electrical connectors 220, 222 may define an axis of alignment that extends through the centers of electrical connectors 220, 222. Electrical connectors 220, 222 may be configured to support a first weight when lamp 100 is mounted to the surface. Thus, without more, electrical connectors 220, 222 may only support a lamp that does not exceed the first weight.

Two or more stability connectors 230 and 232 may also protrude from enclosure 110, such as from the top 200 of enclosure 110. Stability connectors 230, 232 may be used in combination with electrical connectors 220, 222 to mount lamp 100 to mounting support 140 to support a second weight of lamp 100 that is greater than the first weight. Stability connectors 230, 232 may be positioned radially outward from electrical connectors 220, 222. Stability connectors 230, 232 may be positioned in a row along the axis of alignment defined by electrical connectors 220, 222 with stability connector 230 positioned radially outward and on an opposite side of stability connector 232. Stability connector 232 may be positioned such that a space between stability connector 232 and electrical connector 220 is equal in a distance to a space between stability connector 230 and electrical connector 222.

Each of stability connectors 230, 232 may be identical in configuration to the configuration of electrical connectors 220, 222. For example, both types of connectors may be made using the same type of components. Thus, a shape, size, cross-section, and materials of each of the electrical and stability connectors may be identical. In other embodiments, stability connectors 230, 232 may be configured identically to each other but may be configured to be different from the configuration of electrical connectors 220, 222. For example, the stability connectors 230, 232 may have a different shape, size, cross-section or be made of different materials from electrical connectors 220, 222.

Stability connectors 230, 232 may operate in conjunction with electrical connectors 220, 222 to provide stability of lamp 100 when mounted to mounting support 140. Stability connectors 230, 232 may be configured to provide an improved mounting between enclosure 110 and mounting support 140 than may be provided by electrical connectors 220, 222 by themselves. As noted above, stability connectors 230, 232 may also be configured to support a higher weight of lamp 100 than may be provided by electrical connectors 220, 222 alone.

Electrical connectors 220, 222 may be configured to rise to a higher elevation than the stability connectors 230, 232. This configuration may be a consequence of raised center chamber 210.

The higher elevation of electrical connectors 220, 222 may enable the electrical connectors to extend upwards to electrically connect to the power source through mounting support 140.

The top 200 of enclosure 110 may be recessed inward from an outer rim 245 at the top of enclosure 110.

Enclosure 110 may further include seal or gasket 240 inside outer rim 245 around enclosure 110 to provide a good fit between lamp 100 and mounting support 140.

Mounting support 140 may include plate 300. Plate 300 may be configured in the shape of a canopy with a raised sidewall surrounding plate 300. The height of the canopy may be selected to conceal from view components, such as electrical and mounting components.

Figure 3:
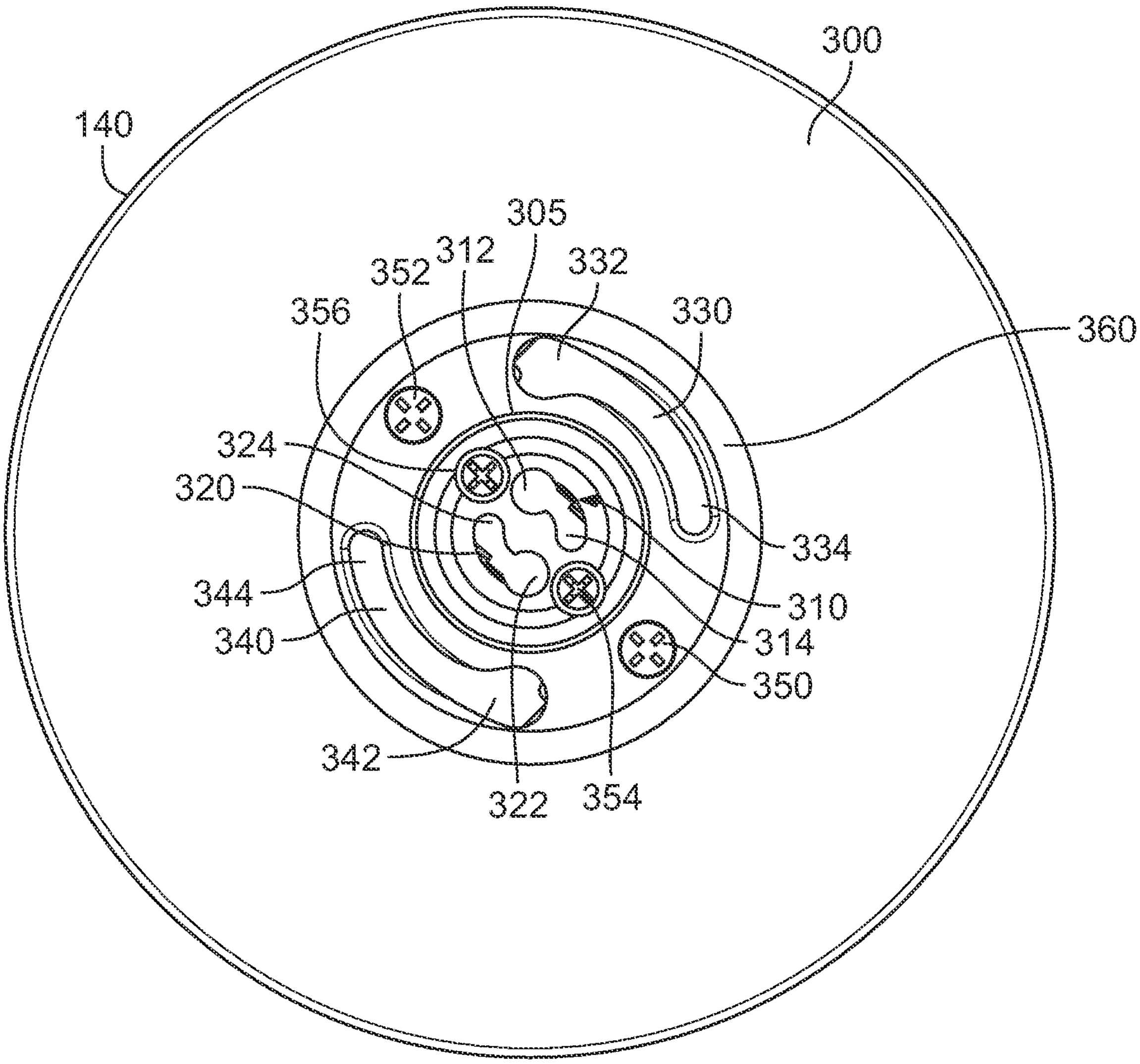
FIG. 3 shows a bottom view of an illustrative canopy, including a plate and hub, of the illustrative mounting support, in accordance with principles of the invention.

FIG. 3 shows illustrative plate 300 and hub 305. Plate 300 may be circular. Plate 300 may be made of a metal, hard plastic, or other suitable material. Plate 300 may include receptacles into which electrical connectors 220, 222 and stability connectors 230, 232 on lamp 100 may engage. Receptacles for electrical connectors 220, 222 may be located within hub 305 that may be positioned at the center of plate 300. Hub 305 may be configured to mate with raised center chamber 210 at the top of enclosure 110. Receptacles may include inner receptacles 310 and 320 on hub 305 for engaging with electrical connectors 220, 222 respectively. Receptacles may include outer receptacles 330, 340 on plate 300 for engaging with respective stability connectors 230, 232.

Each of receptacles 310, 320, 330, and 340 may be configured as an arcuate slot in which a respective connector may be engaged. The connectors of enclosure 110 may be configured to be inserted into respective arcuate slots. The arcuate slots may each have, at one end of the arcuate slot, a first wider opening (e.g., 312, 322, 332, 342) that accommodates the top of the connectors and into which the connectors are initially inserted. With connectors inserted into the wider opening, lamp 100 may be rotated such that the connectors rotate with the enclosure 110 and within the arcuate slots into which they are engaged to be secured into place. Arcuate slots 310, 320, 330, 340 may be configured so that each of the connectors rotate clockwise to be secured to a second position (e.g., 314, 324, 334, 344) within the arcuate slot to secure lamp 100 to mounting support 140. Where the connectors and arcuate slots are configured so that a clockwise rotation of enclosure 110 is used to secure lamp 100 to mounting support 140, lamp 100 may be removable from mounting support 140 by rotating lamp 100 in the counterclockwise direction. Screws 350, 352, 354, and 356 may secure hub 305 and plate 300 to a bracket (described below). In other embodiments, the arcuate slots may be configured for mounting the lamp to a mounting support in a counterclockwise direction and for dismounting the lamp from the mounting support in a clockwise direction.

Figure 4:
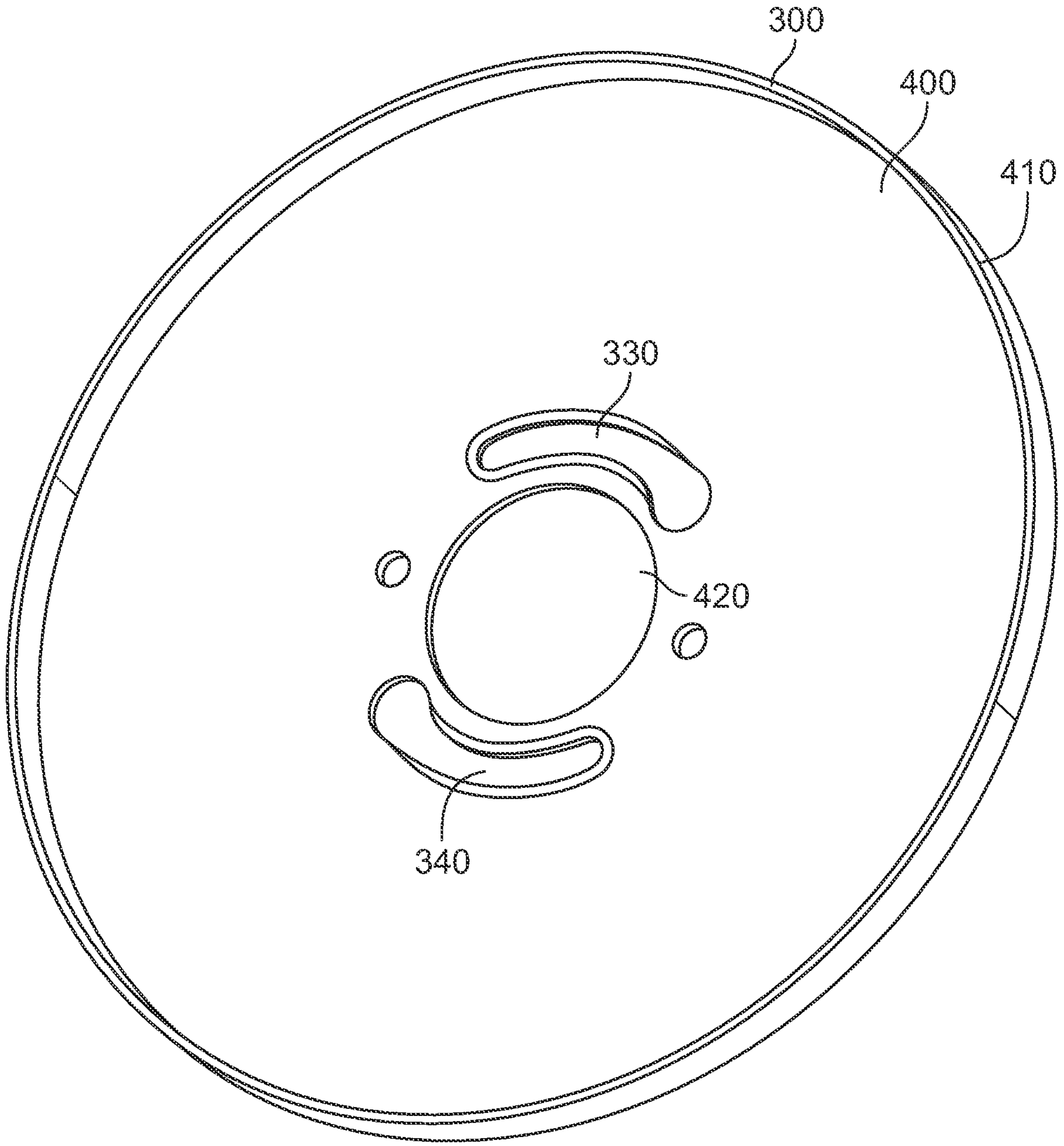
FIG. 4 shows a perspective view from above the illustrative canopy including receptacles for stability connectors on the lamp in accordance with principles of the invention.

FIG. 4 shows an upper surface 400 of plate 300. Upper surface 400 may be surrounded by a raised outer sidewall 410 that is elevated away from surface 400 to provide clearance for additional components, such as electrical connections or other components, to be located above plate 300. A canopy may be formed by the combination of plate 300 and sidewall 410. Plate 300 may include arcuate slots 330, 340 into which a respective one of stability connectors 230, 232 may engage. A central space 420 may be provided on plate 300 to accommodate hub 305. Hub 305 may be secured to plate 300 in one or more ways. For example, an outer surface of hub 305 may be welded to plate 300 to secure hub 305 within central space 420. As other examples, an adhesive, screws or other connectors may be used to secure hub 305 within central space 420.

Figure 5:
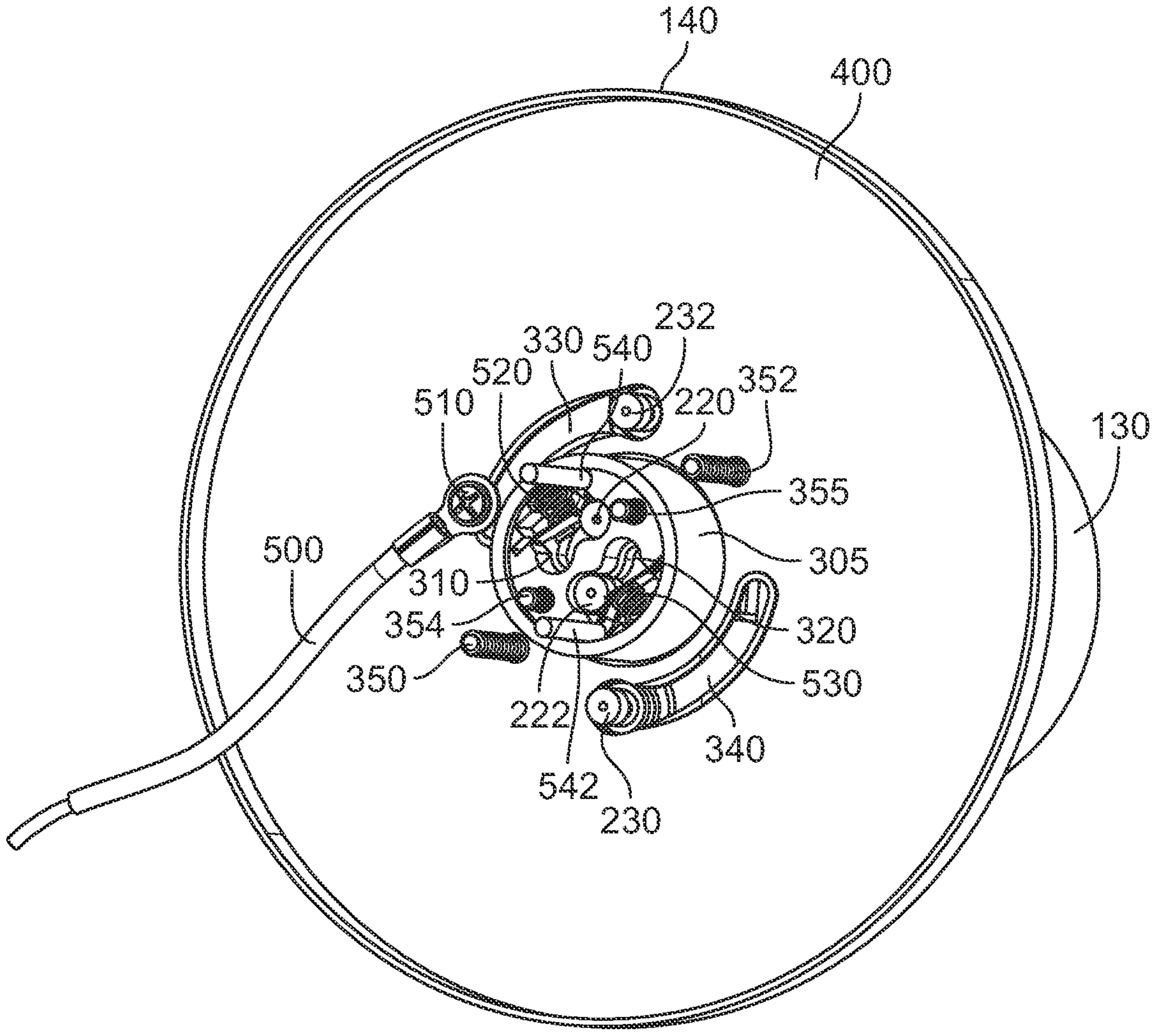
FIG. 5 shows a perspective view from above the illustrative canopy with connectors engaged with the receptacles in accordance with principles of the invention.

FIG. 5 shows a perspective view from above of the illustrative plate 300 with connectors engaged with the respective receptacles on the canopy. Power may be supplied from a power source that may be connected, such as with wiring from an electrical junction box, to lead wires 540, 542 on hub 305. A grounding wire 500 may extend from the electrical junction box. Grounding wire 500 may be secured, such as with a screw 510, to a bracket (FIG. 10) that may be disposed above hub 305. Lead wires 540, 542 may connect to power terminals 600, 610, shown in FIG. 6, that make contact with electrical connectors 220, 222. Electrical connector 220 may engage with arcuate slot 310. Electrical connector 222 may engage with arcuate slot 320. Stability connector 232 may engage with arcuate slot 330 and stability connector 230 may engage with arcuate slot 340.

Figure 6:
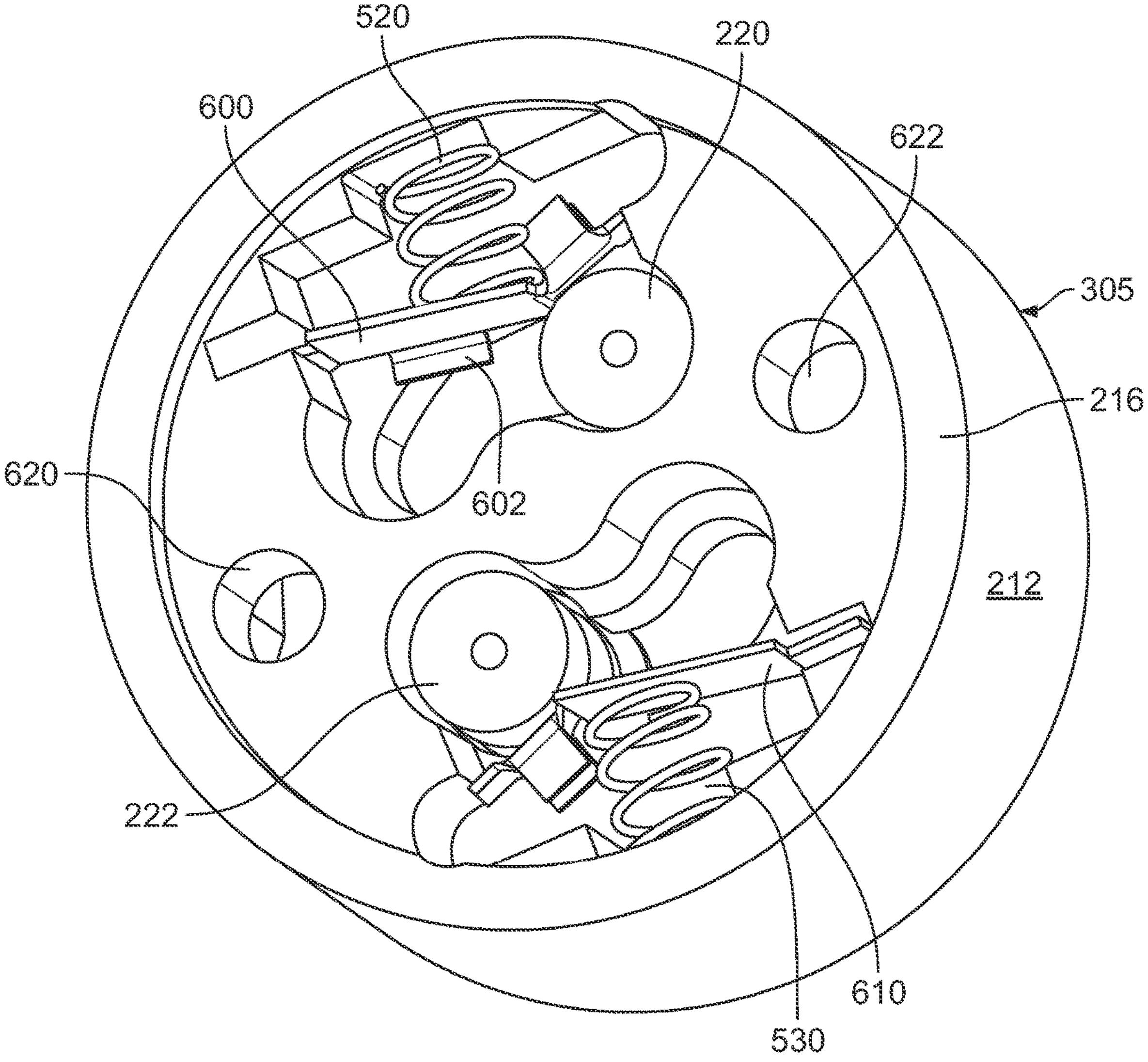
FIG. 6 shows a perspective view of the illustrative hub on the mounting support with which the electrical connectors engage in accordance with principles of the invention.

Arcuate slots 310, 320 may be spring-loaded with compression springs 520, 530 to secure the connection of the respective electrical connectors 220, 222 inserted therein to power terminals 600, 610. The spring loading engagement of the electrical connectors is shown in FIG. 6.

Figure 7:
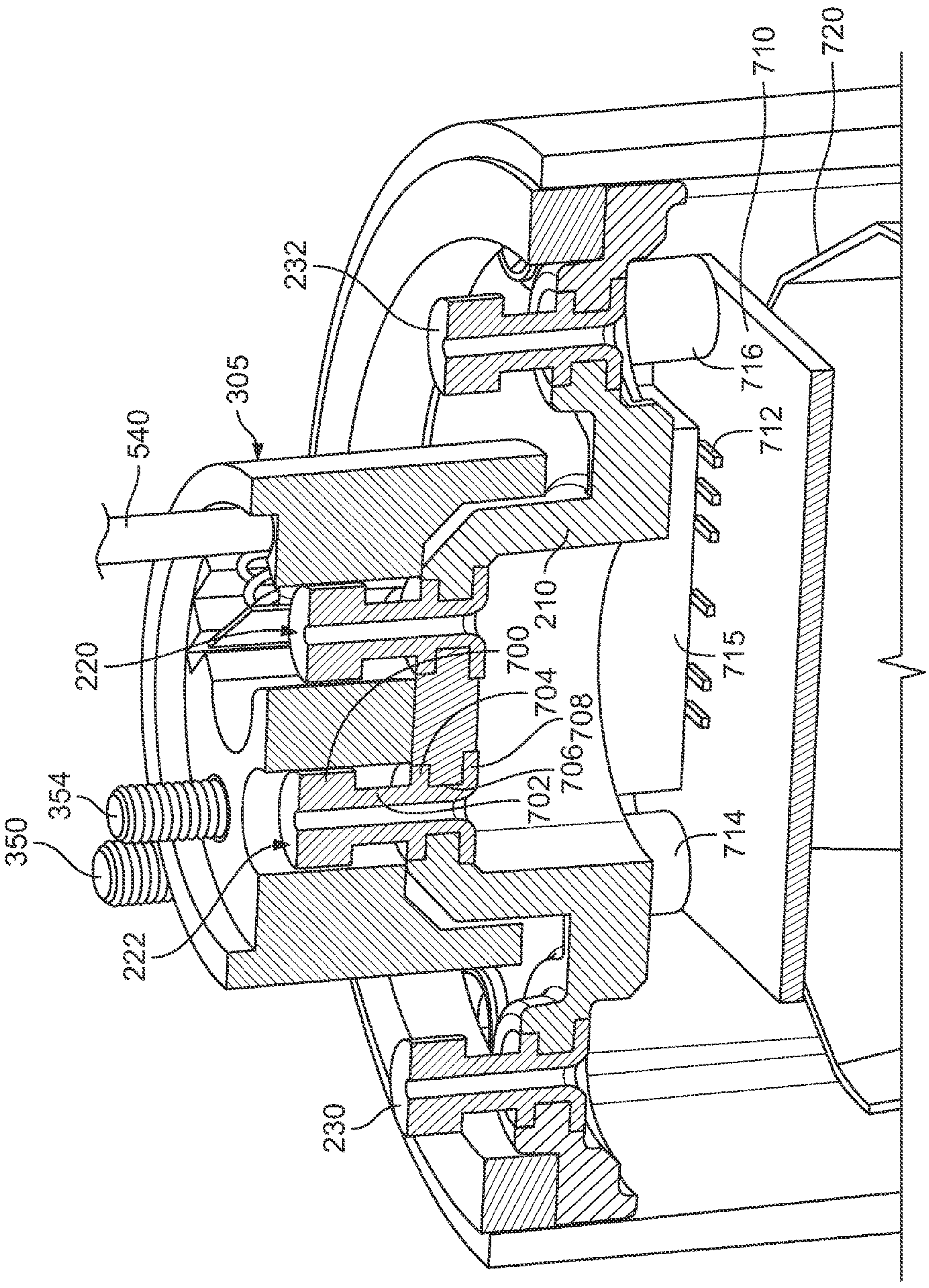
FIG. 7 shows a cross-section of the electrical connectors of the illustrative lamp engaged in the hub of a mounting support in accordance with principles of the invention.

FIG. 7 shows a cross-section of lamp 100 engaged in the mounting support 140. Each of the electrical connectors 220, 222 and the stability connectors 230, 232 is shown as having an identical longitudinal cross-sectional outline. Referring to electrical connector 222 as an example, electrical connector 222 may include a top segment 700 having a first, larger diameter, a second segment 702 having a second diameter that is narrower than the first diameter, a third segment 704 beneath the second segment 702 that may have the same diameter as segment 700, a fourth segment 706 that may have the second diameter, and a fifth section 708 that may have the first diameter. Segments 704, 706, 708 may be secured to raised center chamber 210, such as with welding, an adhesive, a force fit, or some other suitable means. The other connectors may be similarly configured. Hub 305 may be shaped to receive the upper part of raised center chamber 210, including chamfered ring portion 216.

A printed circuit board ("PCB") 710 having electrical components 712 thereon may be used to control power to the light source. A switch 715 may control settings on PCB 710. PCB 710 may be connected to and spaced from the top of enclosure 110 with attachments 714, 716.

Figure 8:
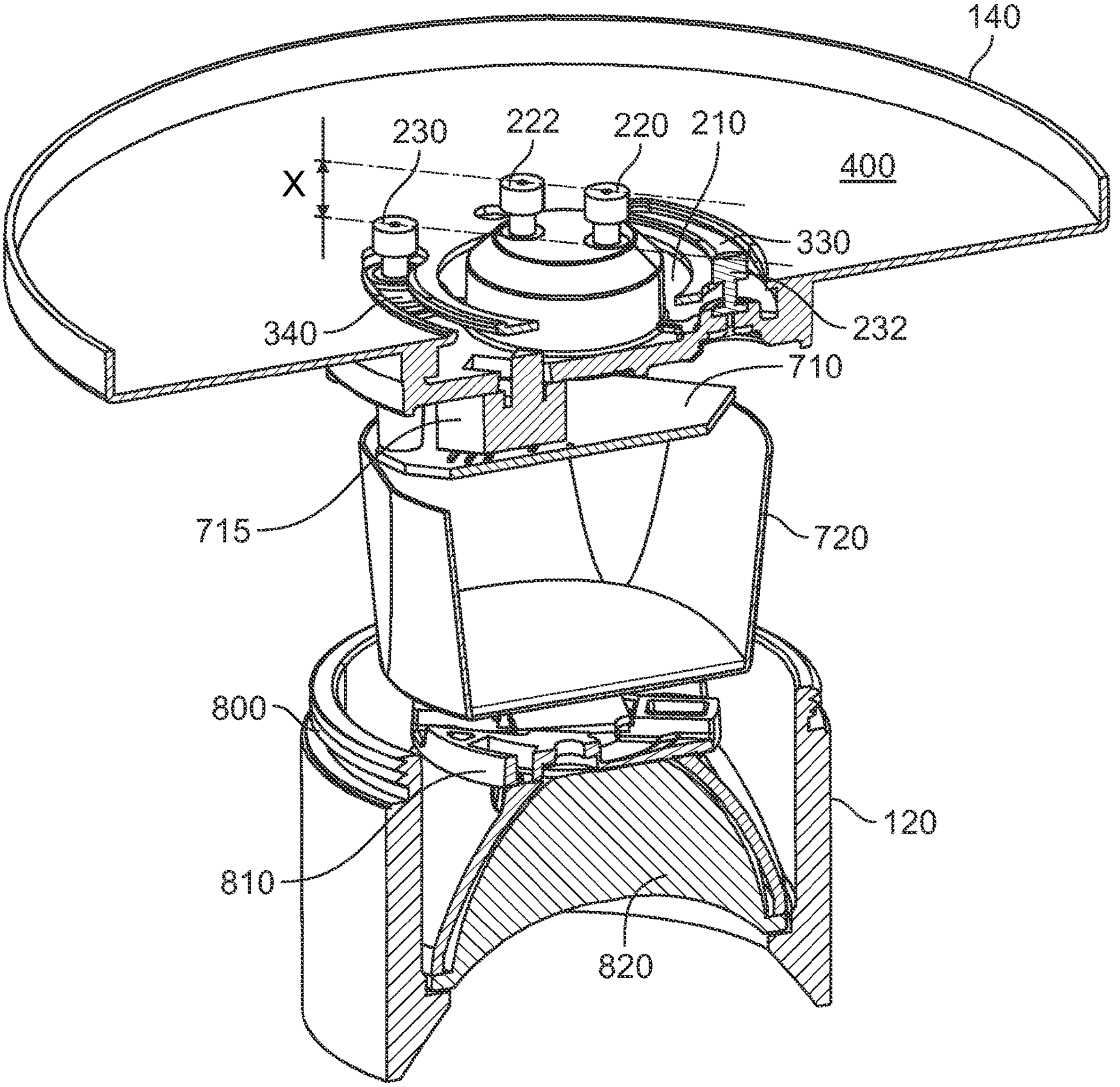
FIG. 8 shows a partially-cutaway cross-section of illustrative portions of the lamp engaged with the stability pins engaged with receptacles on the canopy in accordance with principles of the invention.

FIG. 8 shows a cross-section of lamp 100 and plate 300 with an upper section 115 of enclosure 110 removed. Upper section 115 may be attached to lower section 120 with a threaded connection 800. A light source within enclosure 110 may include an LED array 810 and a reflective surface 820 below LED array 810. Located above light source may be a heat sink 720 to protect PCB 710. FIG. 8 also illustrates that electrical connectors 220, 220 may be located at a higher elevation than stability connectors 230, 232. The difference in elevation may be, for example, may be "X." "X" may be a number within a range, such within a range of 1 to 5 millimeters ("mm"), 1 to 2 mm, 2 to 3 mm, 3 to 4 mm, 4 to 5 mm, 5 to 10 mm, or 10 to 20 mm.

Figure 9:
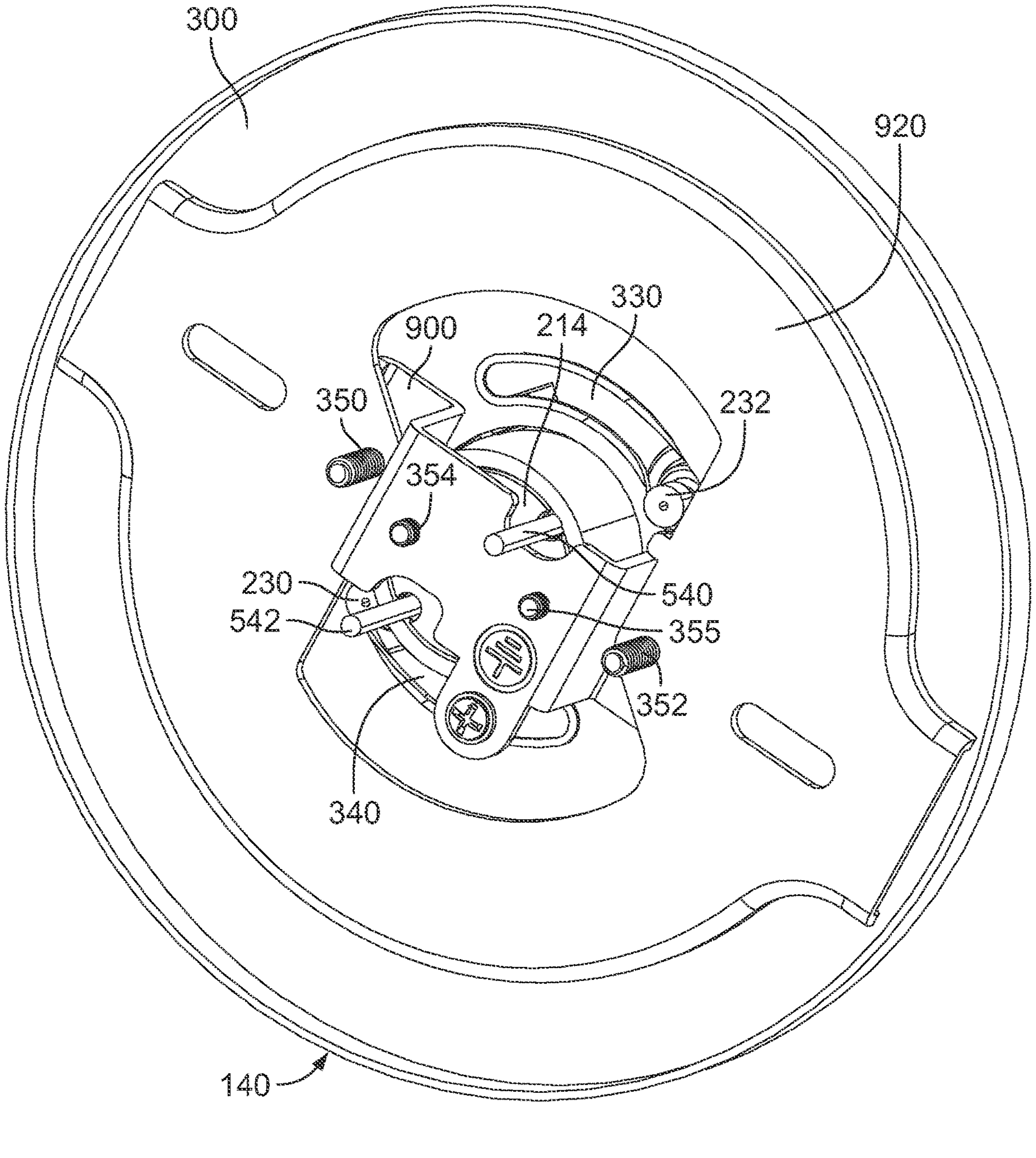
FIG. 9 shows a perspective view from above of an illustrative mounting support with the lamp engaged therein in accordance with principles of the invention.

FIG. 9 shows a perspective view from above of mounting support 140 with lamp 100 engaged therein. Mounting support 140 may include plate 300. Mounting support 140 may include hub 305. Mounting support 140 may include a bracket 900 that may be connected to hub 305, such as with screws 354, 355. Mounting support 140 may include a second plate 920 that fits within the confines of outer wall 410 of plate 300.

Plate 920 may be connected to plate 300 and bracket 900, such as with screws 350, 352. Plate 920 may include an opening that may be configured to allow hub 305, portions of bracket 900, and other components, such as lead wires 540, 542, to pass therethrough. Plate 920 may be configured to reduce flexing of the plate 300 when enclosure 110 is engaged with mounting support 140. The reduced flexing may enable electrical connectors 220, 222 and stability connectors 230, 232 to better engage with the receptacles, e.g., the arcuate slots, and prevent damage to the electrical and stability connectors.

Lamp 100 may be connected to mounting support 140 with one rotation. When hub 305 is a removable hub, lamp 100 may be connected first to hub 305 with electrical connectors 220, 222 with a first rotation, and the connected lamp 100 and hub 305 may be connected to mounting support 140.

Figure 10:
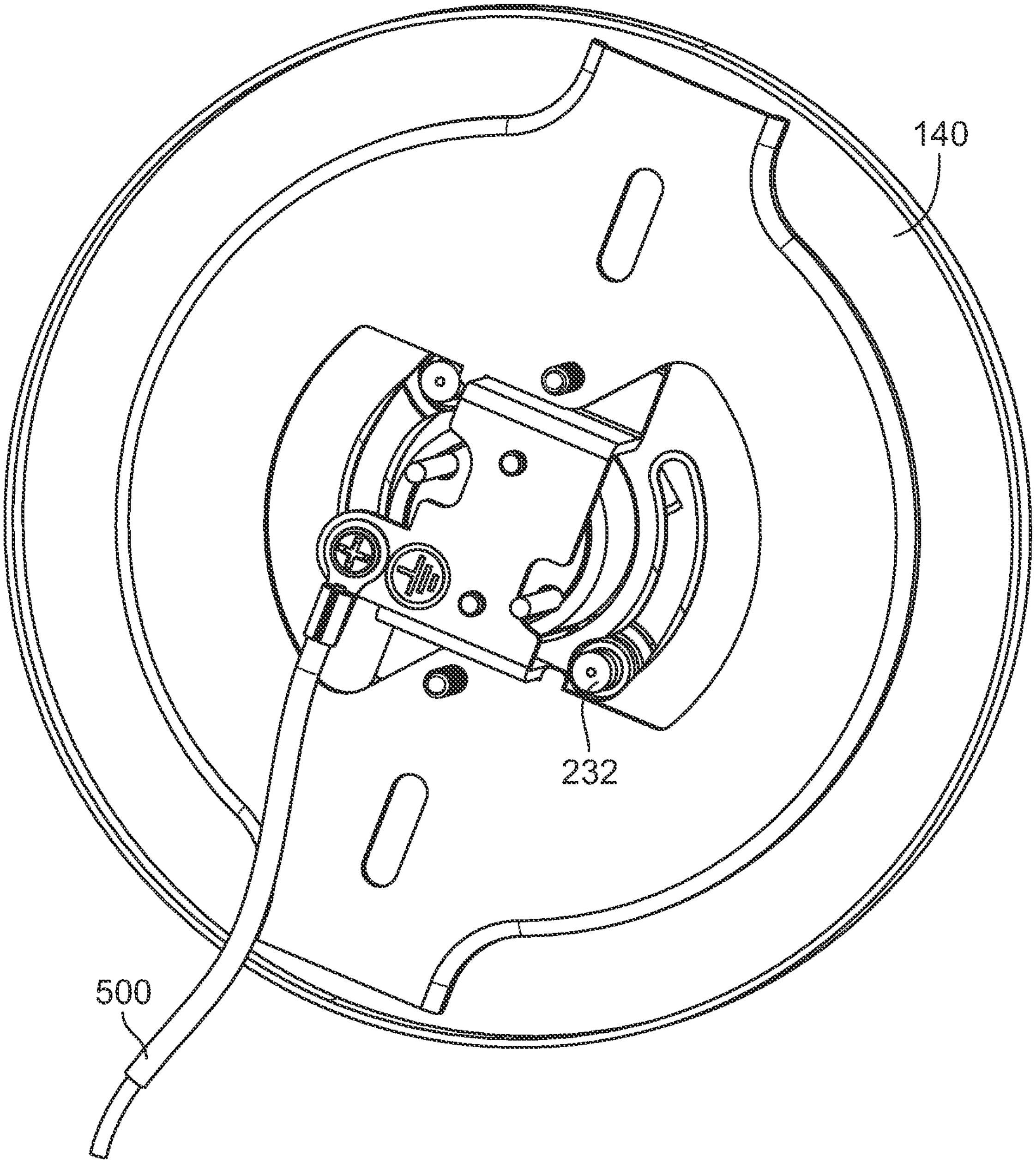
FIG. 10 shows a top view of the illustrative mounting support of FIG. 9 with the lamp engaged therein in accordance with principles of the invention.

FIG. 10 shows a top view of mounting support 140 having lead wires 540, 542 and grounding wire 500.

Figure 11:
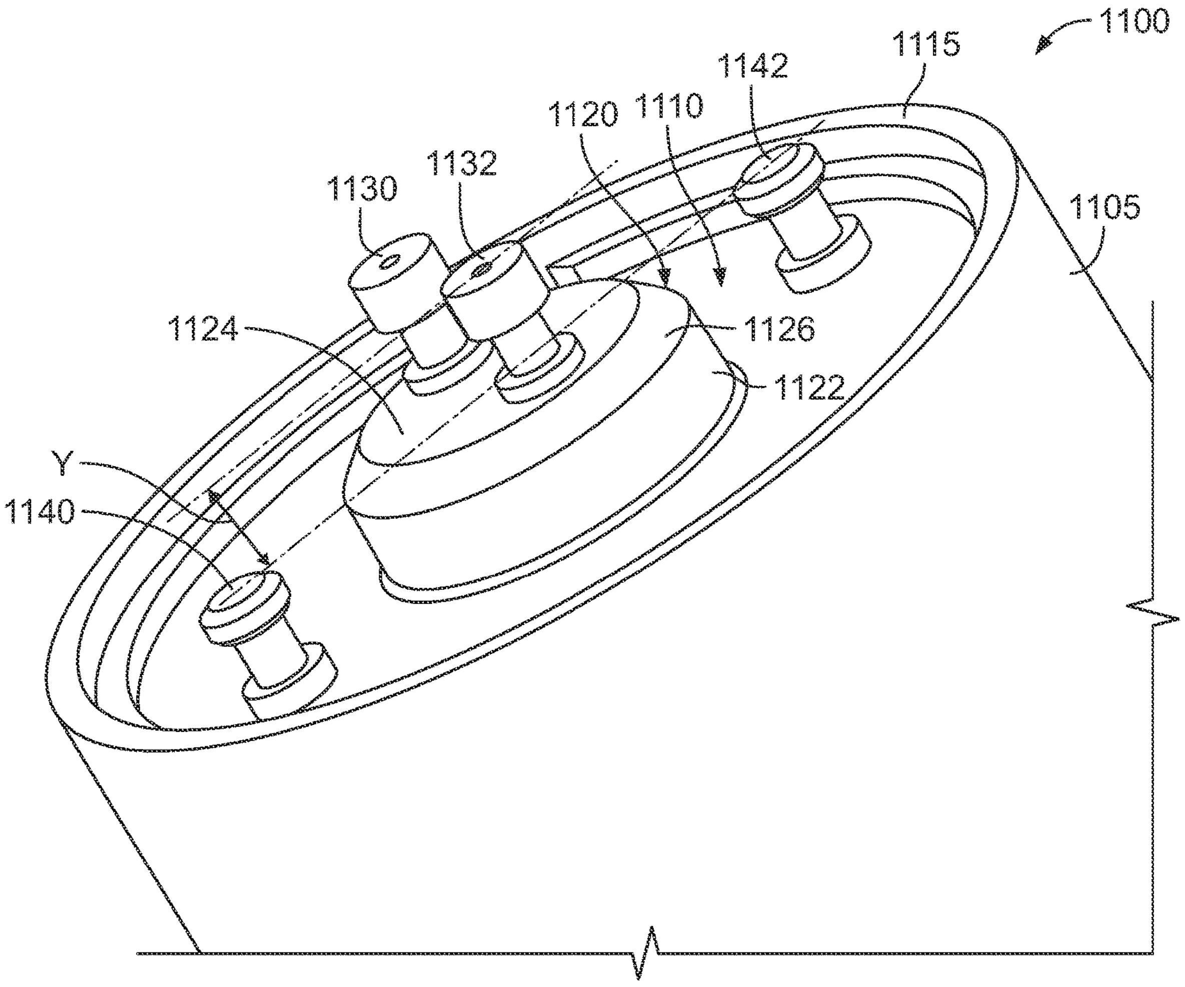
FIG. 11 shows a perspective view from above of a second embodiment of an illustrative lamp of FIG. 1 in accordance with principles of the invention.

FIG. 11 shows a perspective view of an illustrative lamp 1100 in accordance with principles of the invention. The exterior appearance of lamp 1100 may have one or more features in common with the exterior appearance of lamp 100. Lamp 1100 may include a light source. Lamp 1100 may include an enclosure 1105 that may support the light source. The light source may be housed within enclosure 1105.

Enclosure 1105 may include a cylindrical outer wall. Enclosure 1105 may have a top surface 1110 that may be recessed below outer rim 1115 at the top of enclosure 1105. As with lamp 100, lamp 1100 may have a raised center chamber 1120 on a top surface of enclosure 1105. Center chamber 1120 may include exterior wall 1122 that may surround a side of center chamber 1120, upper surface 1124, and chamfered section 1126 between exterior wall 1122 and upper surface 1124. Enclosure 1105 may include two or more electrical connectors, such as electrical connectors 1130, 1132, protruding from the top of enclosure 1105, such as from the top of center chamber 1120. In addition, two or more stability connectors 1140 may protrude from the top surface 1110 of enclosure 1105. Stability connectors 1140, 1142 may be positioned to be transverse to electrical connectors 1130, 1132. For example, the electrical connectors may be perpendicular to the stability connectors as shown. Also, stability connectors 1140, 1142 may have a different cross-section than electrical connectors 1130, 1132. Thus, for example, while electrical connectors 1130, 1132 may be GU10 or GU24 connectors, stability connectors 1140, 1142 may be different. In the illustrated embodiment, there may be a difference "Y" in the elevation of the top of electrical connectors and the stability connectors. "Y" may be a value within a range, such as within one of the ranges specified above for "X".

Electrical connectors 1130, 1132 may be configured to support a first weight when lamp 1100 is mounted to the surface. Stability connectors 1140, 1142 may be used in combination with electrical connectors 1130, 1132 to mount lamp 1100 to mounting support 140 to support a second weight of lamp 1100 that is greater than the first weight.

Figure 12:
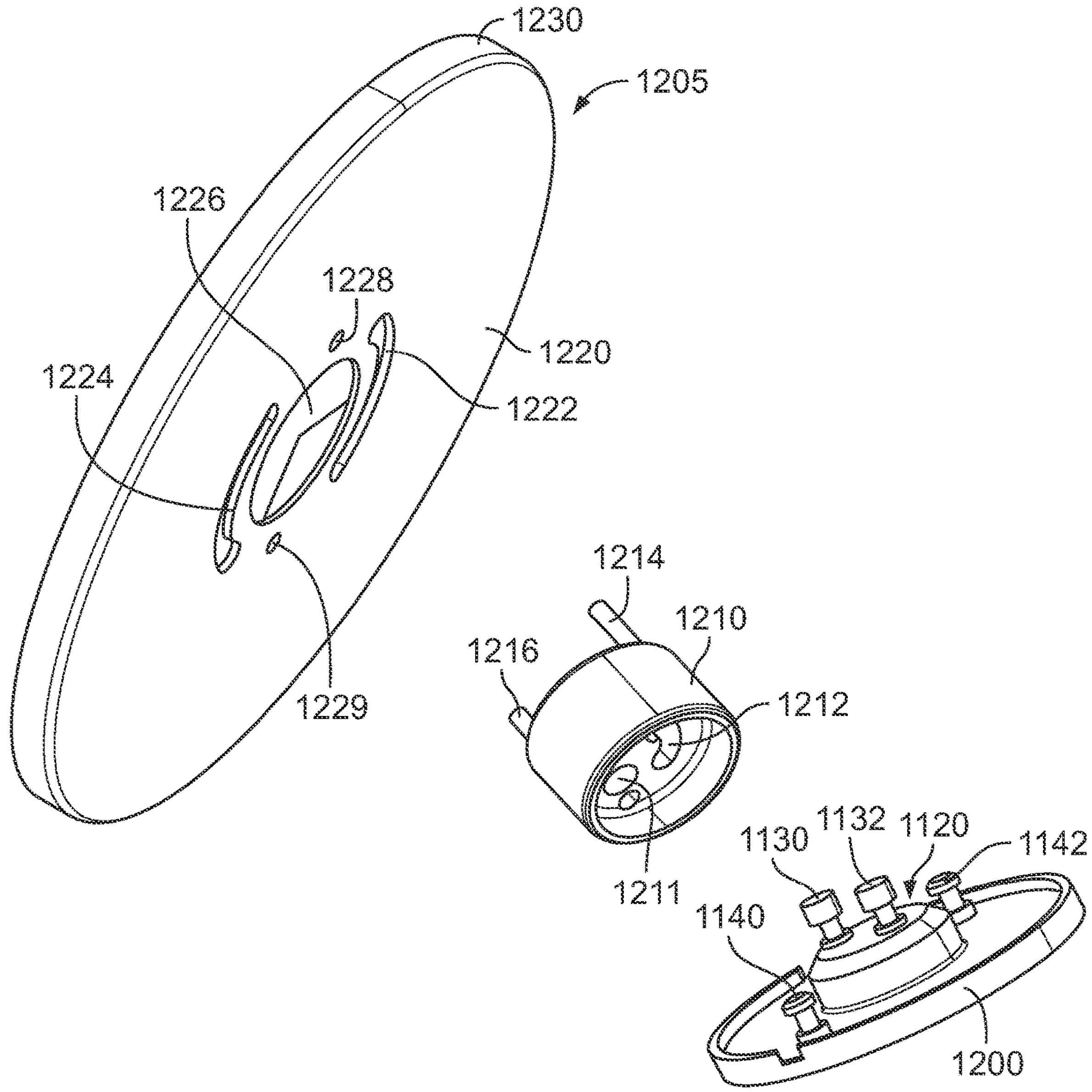
FIG. 12 shows an exploded view of the top of illustrative lamp of FIG. 11 and portions of the mounting support in accordance with principles of the invention.

FIG. 12 shows an exploded view of the top 1200 of lamp 1100 and mounting and portions of mounting support 1205, including hub 1210 and plate 1220. The top of lamp 1100 is shown with electrical connectors 1130, 1132 and stability connectors 1140, 1142. Hub 1210 may include receptacles. Receptacles may be in the form of slots. Slots may be arcuate slots, such as arcuate slots 1211, 1212, that are configured for corresponding electrical connectors 1130, 1132 to be inserted therein and with which the electrical connectors may engage. The arcuate slots for engaging electrical connectors 1130, 1132 may be spring-loaded. Hub 1210 may include lead wires 1214, 1216 that may be connected to hub 1210. Lead wires 1214, 1216 may make contact to power terminals in hub 1210 that make contact with electrical connectors 1130, 1132.

Plate 1220 may include additional receptacles that are configured so that stability connectors 1140, 1142 may be inserted and engaged therein. Plate 1220 may further include a center hole 1226 into which hub 1210 may be inserted.

Hub 1210 may be connected to plate 1220 in one of various ways. Holes 1228, 1229 may be provided in plate 1220 to mount plate 1220 to a surface, such as a ceiling or wall. Hub 1210 may be connected to plate 1220 and enclosure 1105 may then be mounted with electrical connectors 1130, 1132 and stability connectors 1140, 1142 being engaged simultaneously. The lamp may be installed by a single rotation of enclosure 1105.

Enclosure 1105 may first be connected to hub 1210 with the electrical connectors being engaged with hub 1210, if hub 1210 is not already connected to plate 1220. Thereafter, enclosure 1105 and hub 1210 may be mounted to plate 1220 with the stability connectors engaged after the electrical connectors are engaged.

Figure 13:
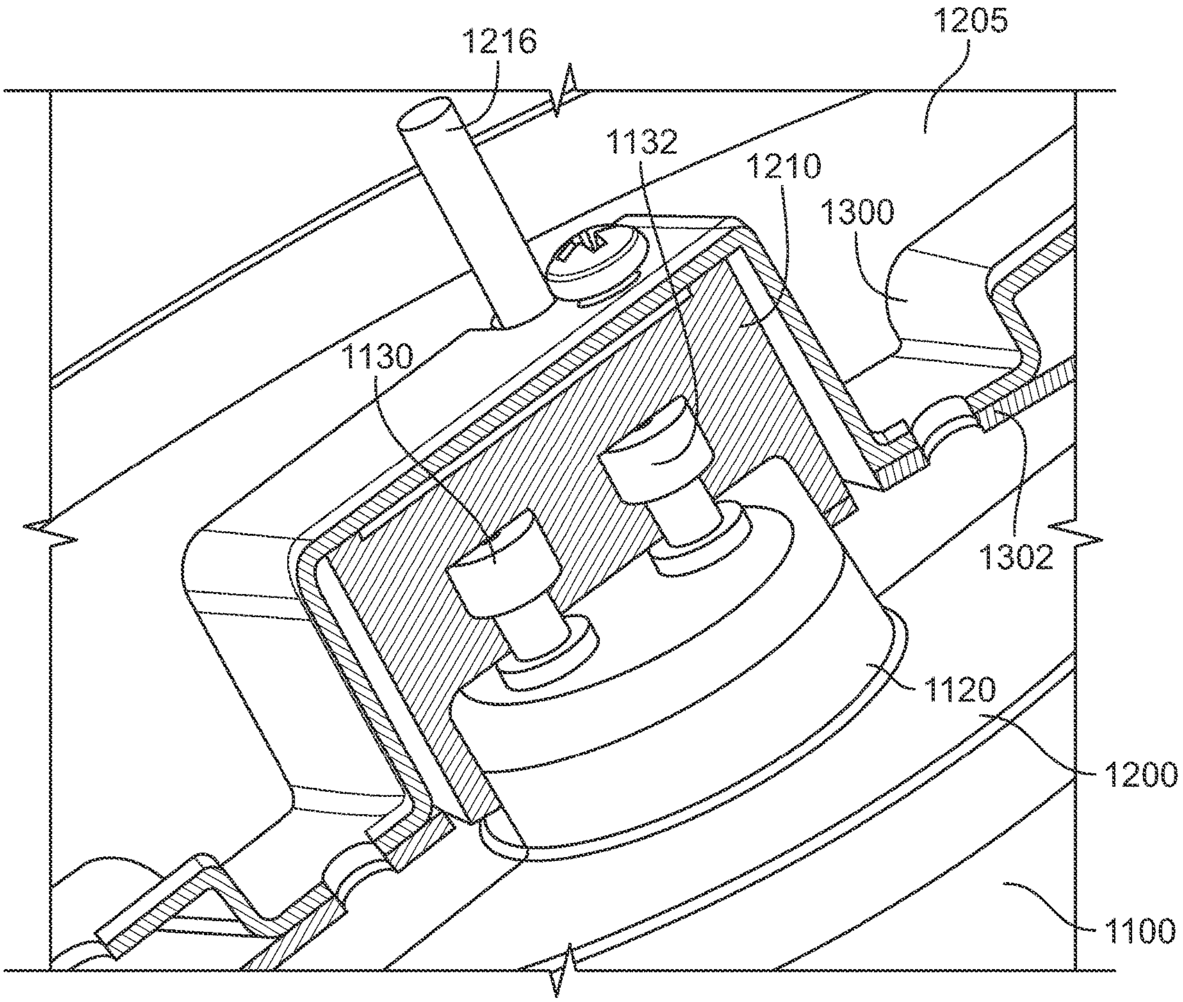
FIG. 13 shows a partial cross-sectional view of the electrical connectors on the illustrative lamp of FIG. 11 engaged in receptacles on the illustrative mounting support in accordance with principles of the invention.

FIG. 13 shows a partial cross-sectional view of electrical connectors 1130, 1132 engaged with the mounting support 1205. Electrical connectors 1130, 1132 may be engaged in receptacles in hub 1210. A bracket 1300 that extends above hub 1210 and above plate 1220 may be configured to connect hub 1210 to plate 1220.

Figure 14:
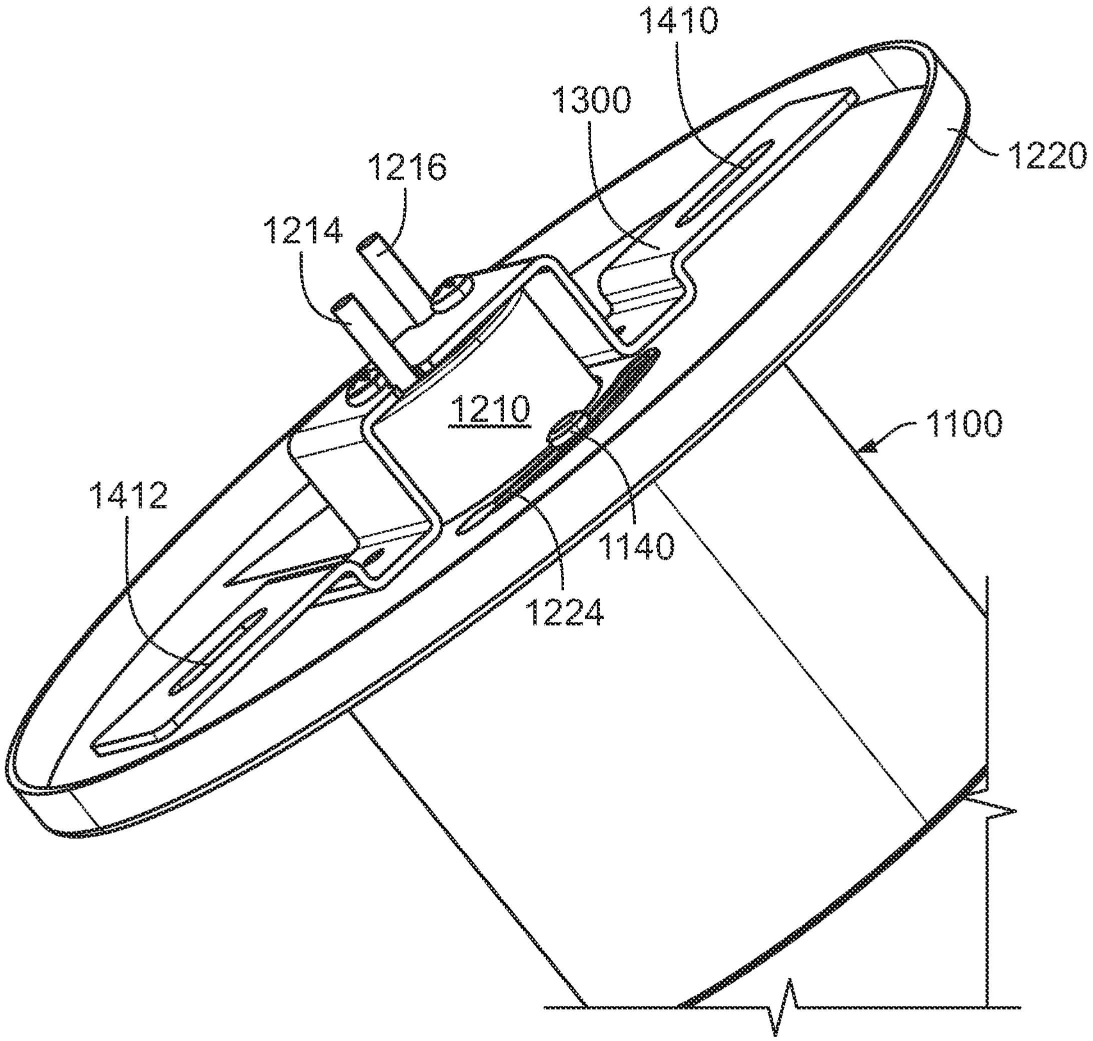
FIG. 14 is a perspective view of the top of illustrative lamp of FIG. 11 engaged with the illustrative mounting support in accordance with principles of the invention.

FIG. 14 shows another view of the top of lamp 1100 engaged without plate 1220 to the mounting support. As the electrical connectors 1130, 1132 are perpendicular to stability connectors 1140, 1142, bracket 1300 may be positioned to not cover the stability connectors 1140, 1142. Screws may be inserted through holes 1410, 1412 in bracket 1300 (and through holes 1228, 1229 in plate 1220) to secure mounting support 1205 to a surface.

Figure 15:
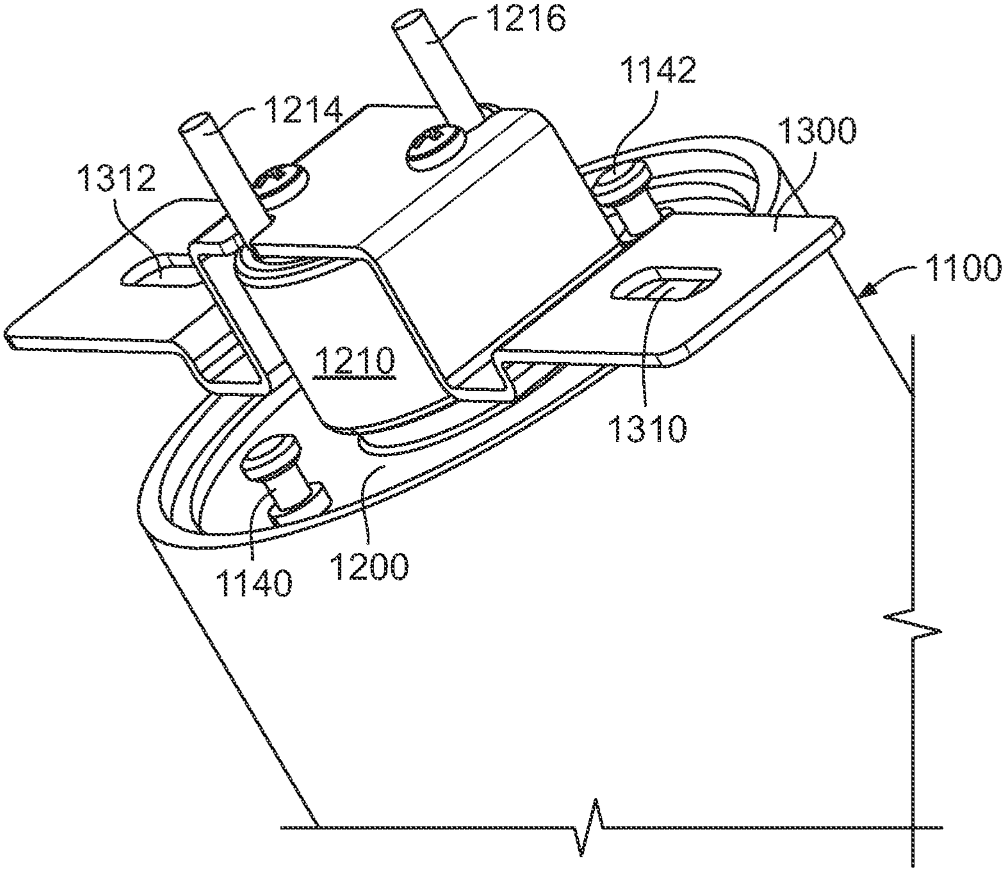
FIG. 15 is a perspective view of the illustrative lamp of FIG. 11 connected to a portion of the mounting support in accordance with principles of the invention.

FIG. 15 is a perspective view of lamp 1100 connected to bracket 1300, but with plate 1220 removed to further illustrate that stability connectors 1140, 1142 may be connectors that are not covered by bracket 1300 in this embodiment.

Figure 16:
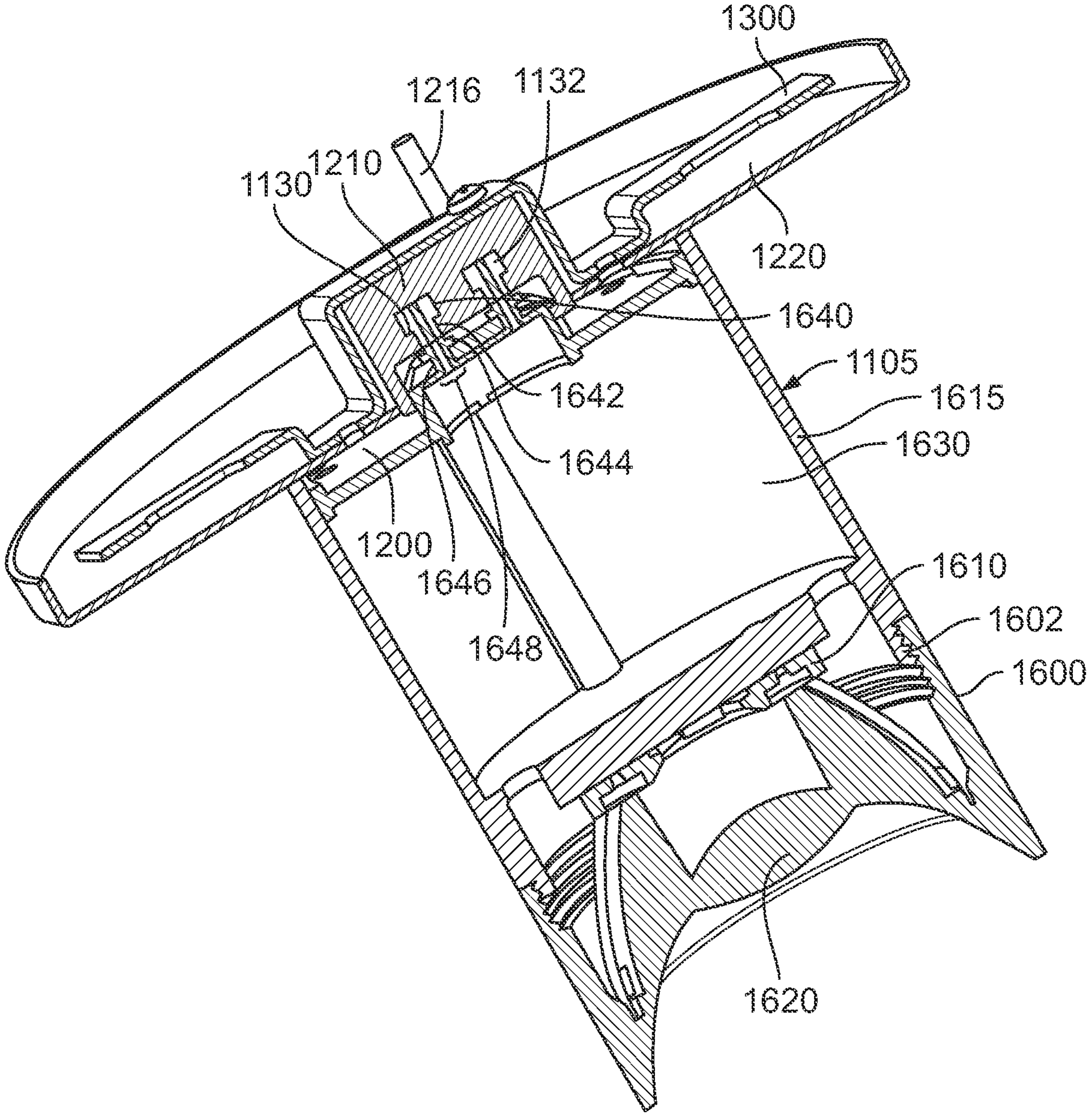
FIG. 16 shows a cross-sectional view of the illustrative lamp of FIG. 11 connected to the illustrative mounting support in accordance with principles of the invention.

FIG. 16 shows a cross-sectional view of lamp 1100 of FIG. 11 connected to the mounting support along a line defined by the electrical connectors. Enclosure 1105 may house light source 1610. Light source 1610 may include an array of LEDs. A conical shaped reflective surface 1620 may be positioned beneath light source 1610. Enclosure 1105 may have lower section 1600 that may be connected to upper section 1615 with a threaded connection 1602. Electrical connectors 1130, 1132 may have the shapes shown. As with electrical connectors 220, 222 of lamp 100, the electrical connectors 1130, 1132 may each have the shown shape. Referring to electrical connector 1130 as an example, electrical connector 1130 may include top segment 1640 having a first, larger diameter, second segment 1642 having a second diameter that is narrower than the first diameter, third segment 1644 beneath the second segment 1642 that may have the same diameter as segment 1640, fourth segment 1646 that may have the second diameter, and fifth section 1648 that may have the first diameter.

Figure 17:
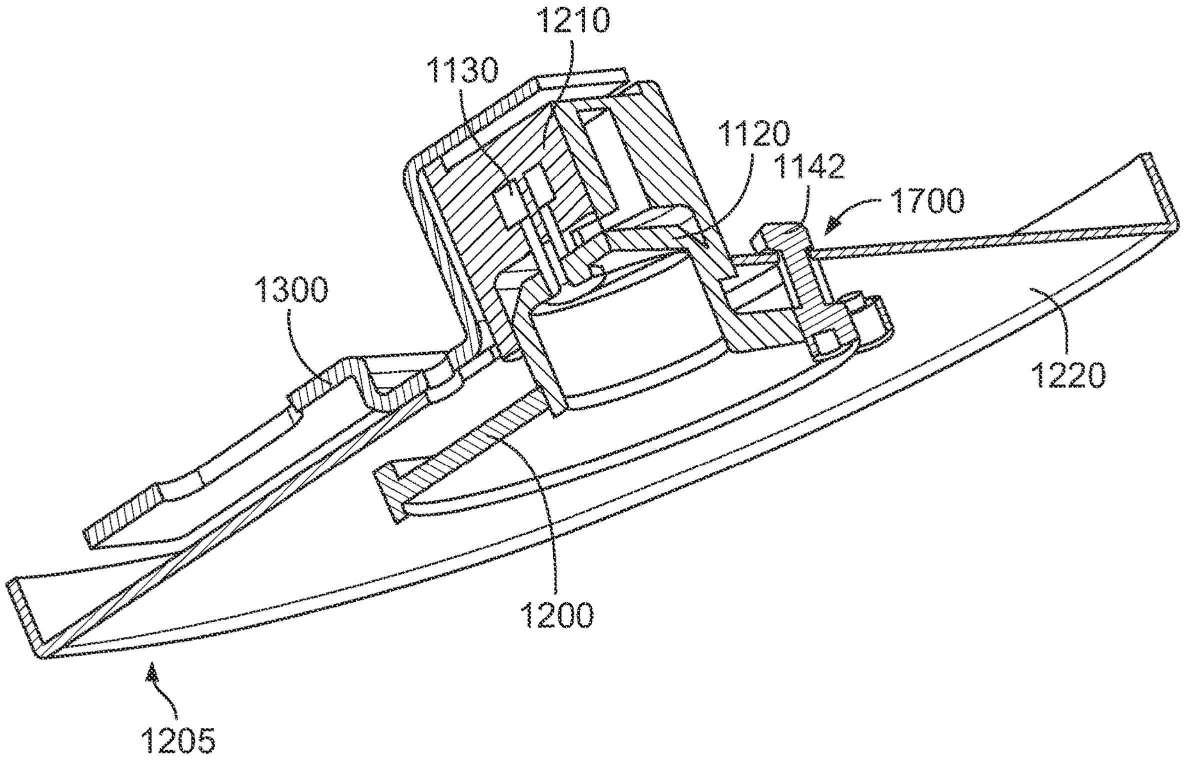
FIG. 17 shows a cross-section of a quarter of the top of the illustrative lamp of FIG. 11 engaged in the illustrative mounting support in accordance with principles of the invention.
Figure 18:
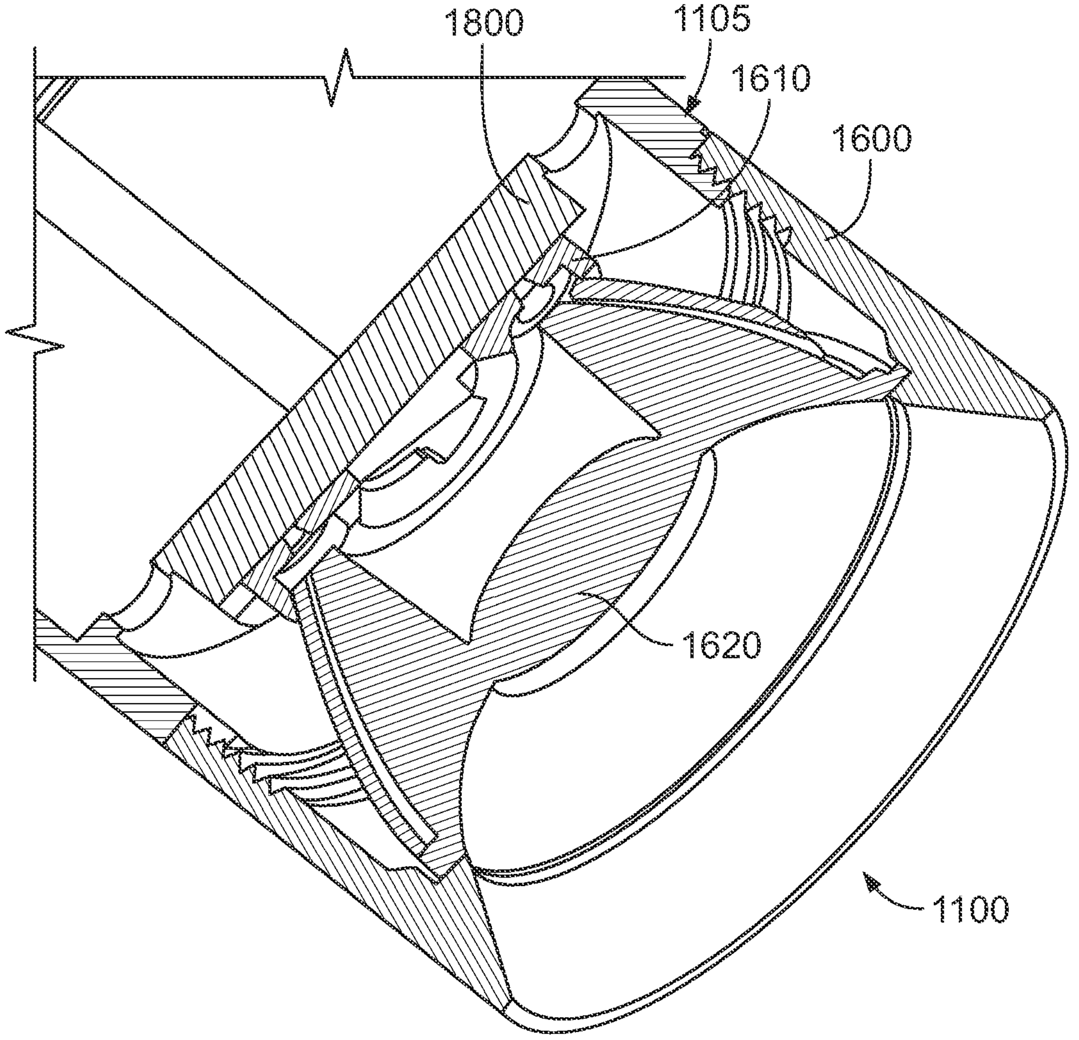
FIG. 18 shows a cross-section of the lamp in accordance with principles of the invention.

FIG. 17 shows a cross-section of a quarter of the top of the lamp 1100 engaged in mounting support 1205. A possible cross-section 1700 of a stability connector 1142 is shown. FIG. 18 shows a cross-section of lamp 1100. A PCB 1800 may be provided above the light source to control the light source.

Figure 19:
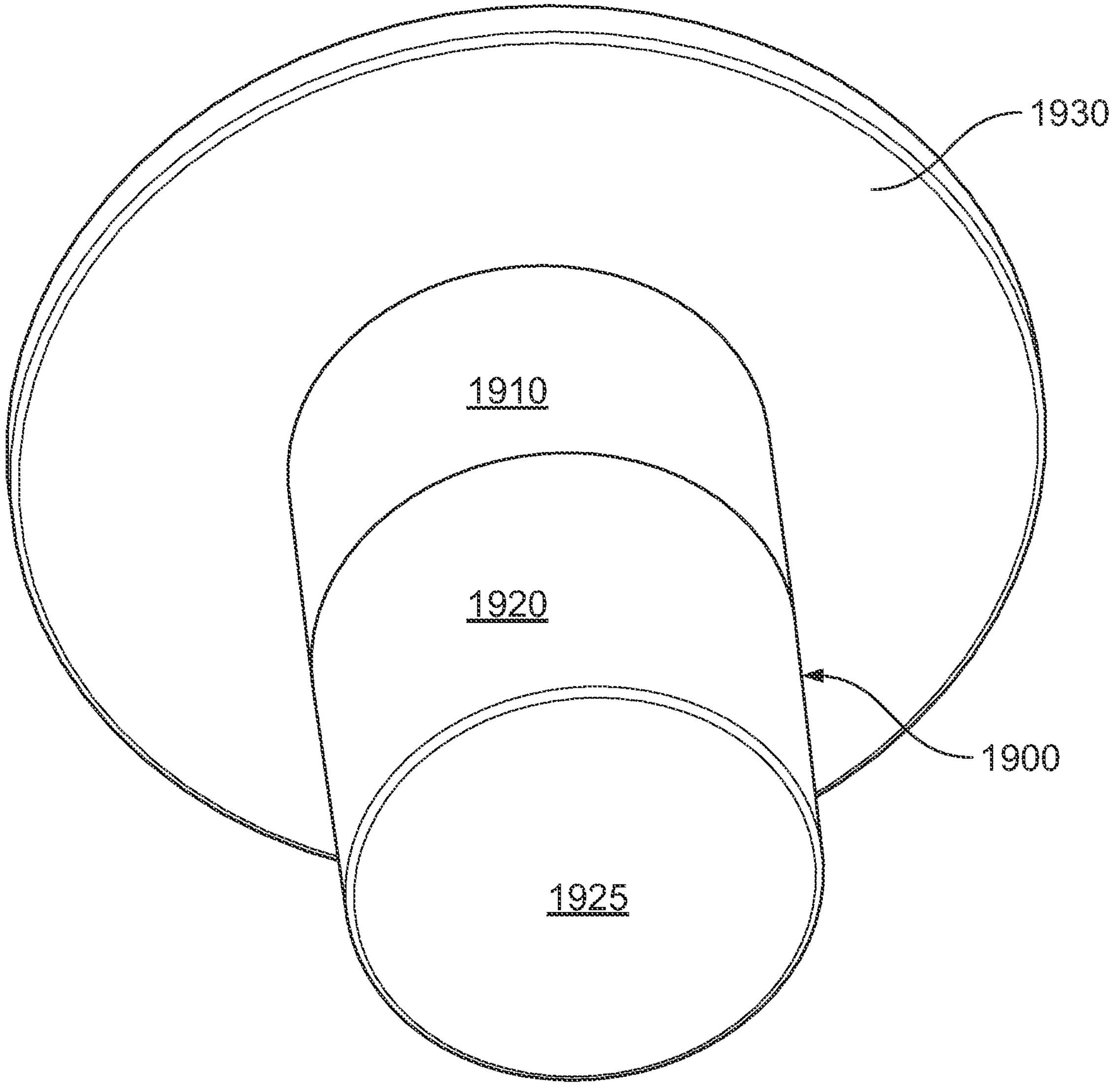
FIG. 19 shows a perspective view of another illustrative lamp connected to an illustrative canopy in accordance with principles of the invention.

FIG. 19 shows a perspective view of another embodiment of a lamp 1900 that may be provided in accordance with principles of the invention. Lamp 1900 may be connected to an illustrative mounting support 1930. Like lamp 1100, this lamp may be a downlight. Lamp 1900 may include an enclosure 1905 that includes multiple vertical sections 1910 and 1920 assembled together. Rather than having a conical reflective surface recessed within the bottom of lamp 100 and lamp 1100, lamp 1900 may have a flat bottom 1925. Lamp 1900 may include a light source. Enclosure 1905 may support the light source. The light source may be housed within enclosure 1905.

Figure 20:
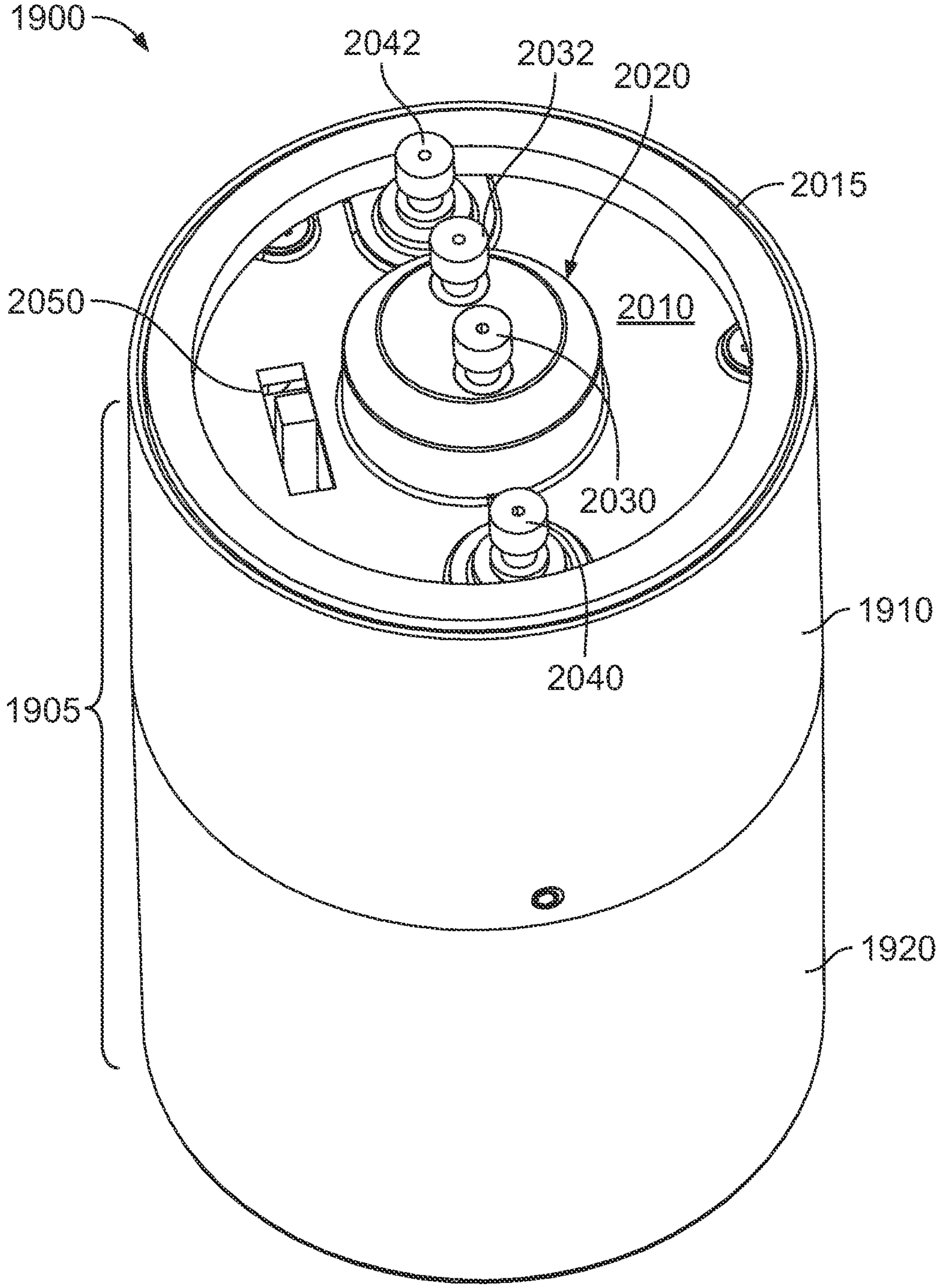
FIG. 20 shows a perspective view from above the illustrative lamp of FIG. 19 in accordance with principles of the invention.

A top of enclosure 1905 is shown in FIG. 20 and may be similar to a top of enclosure 110 of lamp 100 (shown in FIG. 1). Enclosure 1905 may include a top 2010 that is recessed beneath a top outer rim 2015 of enclosure 1905. Connectors may be disposed on top of enclosure 1905 for engagement with a mounting support. Enclosure 1905 may include raised center chamber 2020 in the center of top 2010. The connectors may include two or more electrical connectors 2030, 2032 that may protrude from a top of raised center chamber 2020. The connectors may include two or more stability connectors 2040, 2042 that may protrude upward from top 2010 radially outward from electrical connectors 2030, 2032. Electrical connectors 2030, 2032 and stability connectors 2040, 2042 may be aligned in a row. The tops of electrical connectors 2030, 2032 may extend to a higher elevation than the elevation of tops of stability connectors 2040, 2042. The electrical connectors 2030, 2032 and the stability connectors 2040, 2042 may be the same, as shown. The electrical connectors 2030, 2032 and the stability connectors 2040, 2042 may be different from one another.

Electrical connectors 2030, 2032 may be configured to support a first weight when lamp 1900 is mounted to the surface. Stability connectors 2040, 2042 may be used in combination with electrical connectors 2030, 2032 to mount lamp 1900 to mounting support 1930 to support a second weight of lamp 1900 that is greater than the first weight.

Figure 21:
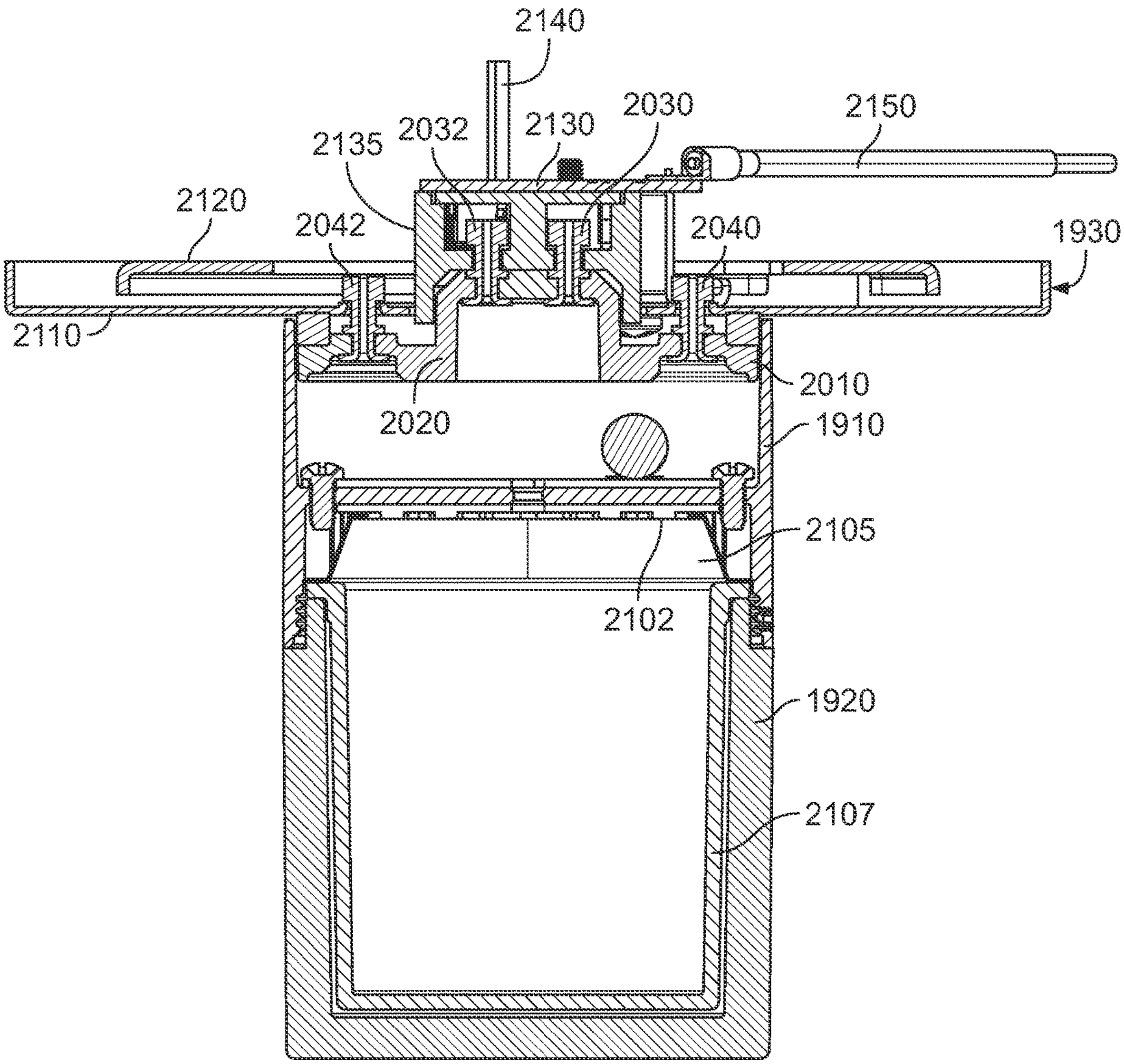
FIG. 21 shows a cross-section of the illustrative lamp of FIG. 19 engaged in the mounting support in accordance with principles of the invention.

FIG. 21 shows a cross-section of lamp 1900 engaged in a mounting support 1930. Mounting support 1930 may have one or more features in common with mounting support 140. Mounting support 1930 may differ from mounting support 140.

Upper section 1910 of enclosure 1905 may retain a light source 2102 therein. Light source 2102 may sit above reflector 2105 that, in operation, may project light downward. Frosted cover 2107 may be disposed below reflector 2105 to provide diffusion to light emitted from light source 2102. Section 1920 may serve as an outer cover that covers frosted cover 2107 to provide diffusion to light emitted from light source 2102. Section 1920 may be transparent or translucent. Section 1920 may be made of glass, plastic, crystal or other transparent or translucent material.

Mounting support 1930 may include first plate 2110 that may be part of a canopy with a raised sidewall above plate 2110. Mounting support 1930 may include second plate 2120, and bracket 2130 disposed above a hub 2135. Portion of hub 2135 may fit within an electrical junction box within a surface, such as a ceiling or wall, to enable mounting support 1930 to fit flush against that surface. Lead wires, including lead wire 2140, may extend from above hub 2135. The lead wires may connect to wiring from the electrical junction box and make contact with power terminals in hub 2135 that make contact with electrical connectors 2030, 2032 to power lamp 1900. Grounding wire 2150 may be connected to bracket 2130 on hub 2135.

Figure 22:
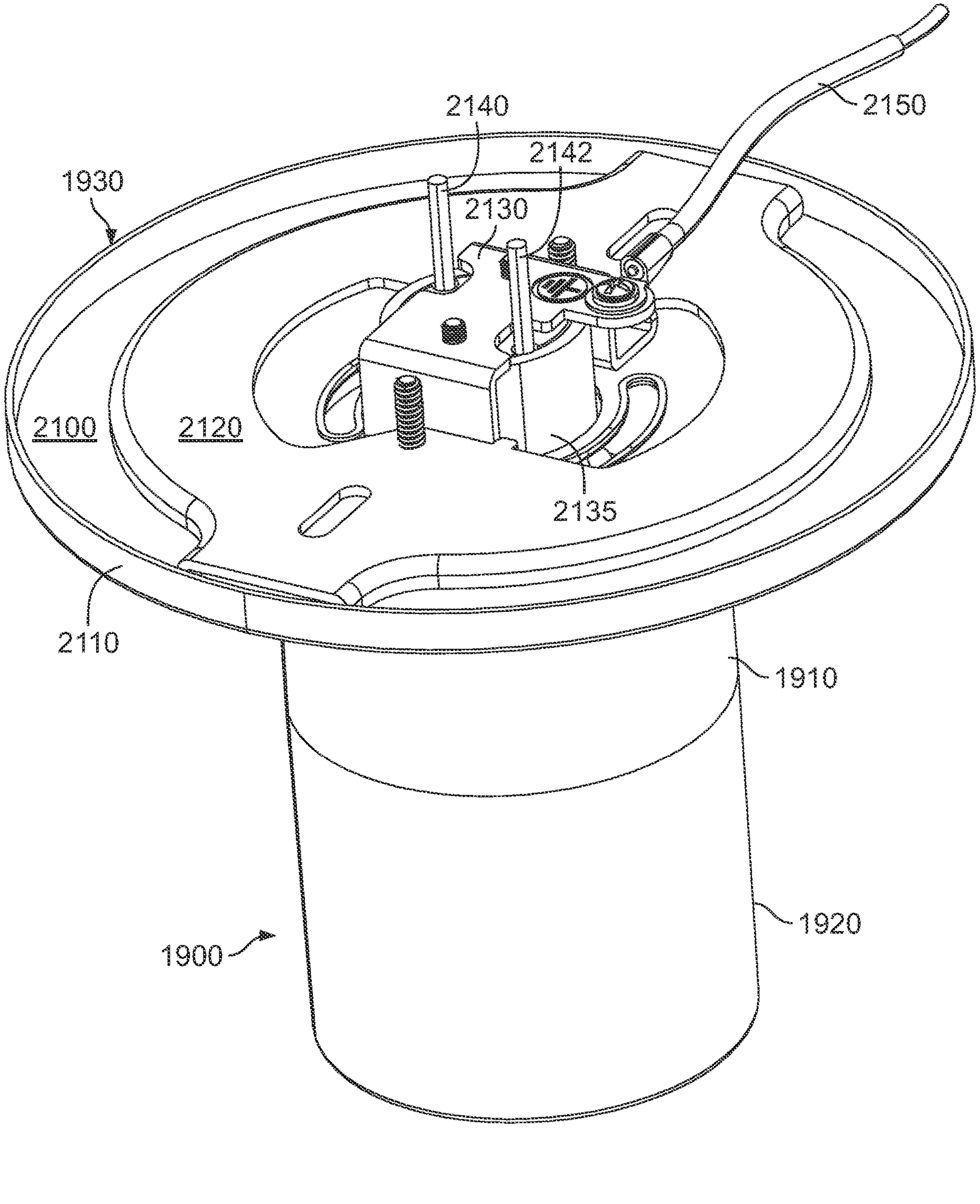
FIG. 22 shows a perspective view from above an illustrative mounting support with the illustrative lamp of FIG. 19 engaged therein in accordance with principles of the invention.

FIG. 22 shows additional details of an upper side of mounting support 1930. As shown, hub 2135 may have mounting bracket 2130 disposed above it to connect hub 2135 to canopy 2100 of mounting support 1930. Second plate 2120 may cover the inside surface of the canopy to increase the rigidity of the mounting support 1930. Canopy 2100 may include an outer sidewall to provide space for components of the mounting support 1930.

Figure 23:
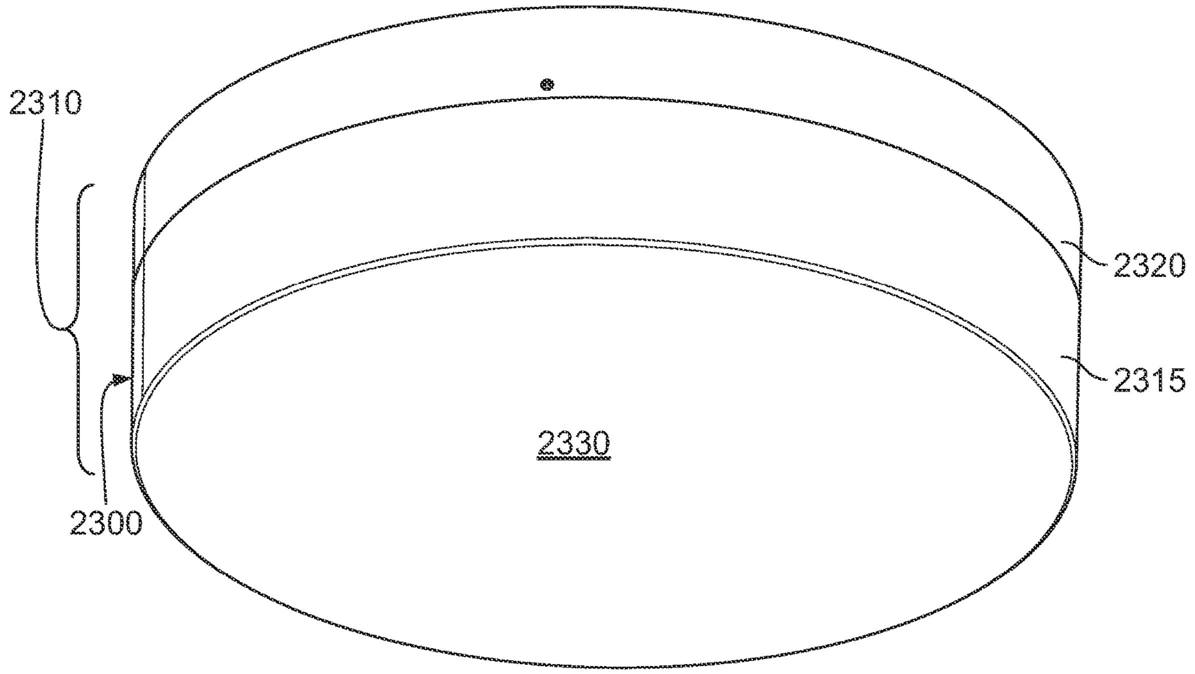
FIG. 23 shows a perspective view of another illustrative lamp connected to an illustrative canopy in accordance with principles of the invention.

FIG. 23 shows a perspective view of another embodiment of a lamp 2300 that may include an enclosure 2310 that may be provided in accordance with principles of the invention. Lamp 2300 may be a lamp that is flush mounted to a ceiling. Lamp 2300 may include a light source. Lamp 2300 may include an enclosure 2310 that may support the light source. The light source may be housed within enclosure 2310.

Enclosure 2310 may have a diameter that is greater than the depth. Enclosure 2310 may include lower portion 2315 and canopy 2320 attached thereto. Canopy 2320 may form part of enclosure 2310. Enclosure 2310 may be configured to be mounted flush with the surface to which lamp 2300 is to be mounted. Enclosure 2310 may have a diameter that, in operation, is parallel to the surface. Enclosure 2310 may have a depth that, in operation, extends away from the surface. Lamp 2300 may have a large diameter relative to the diameter of lamps described above, such as lamps 100, 1100, and 1900.

Figure 24:
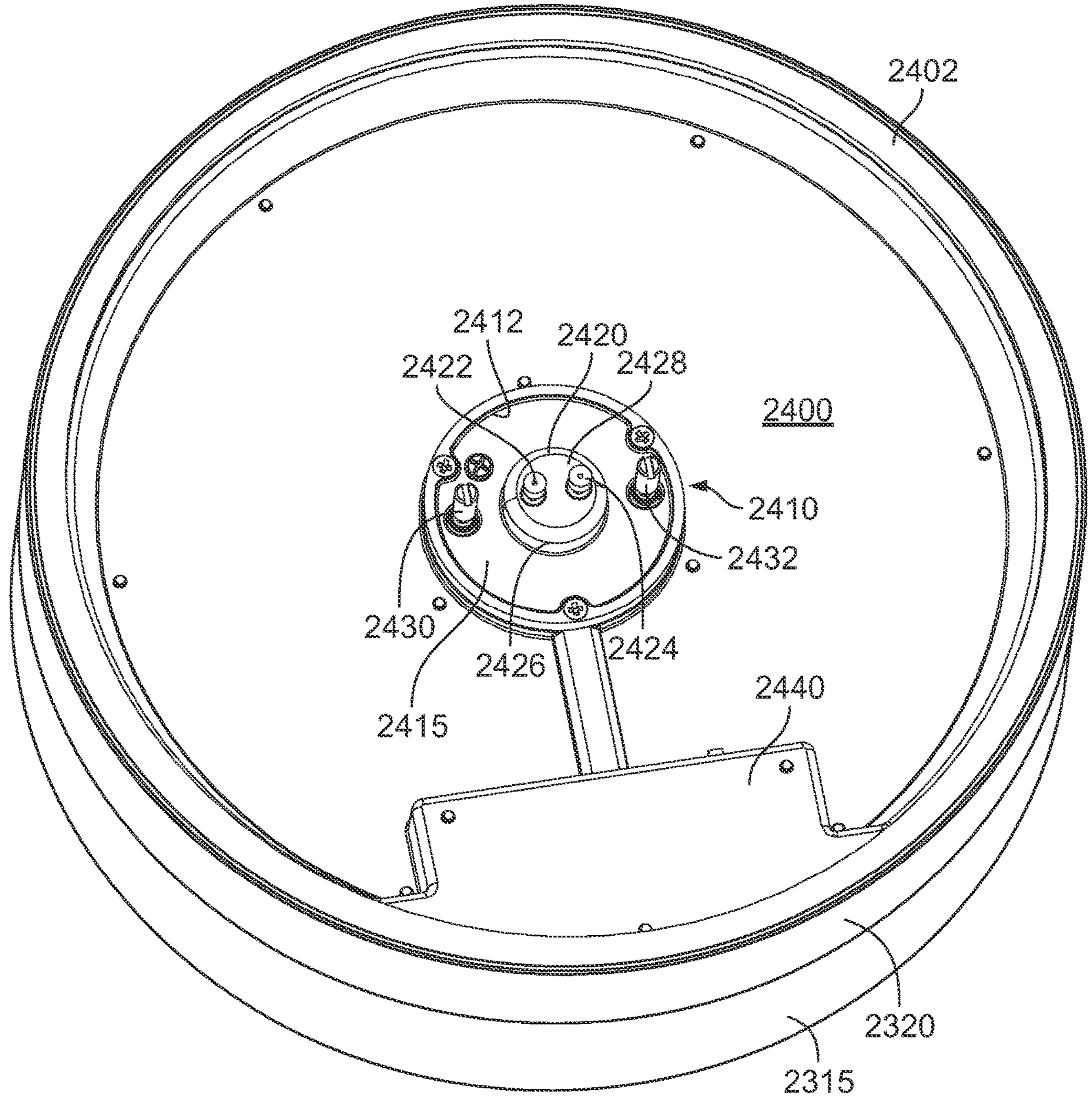
FIG. 24 shows a perspective view from above the illustrative lamp of FIG. 23 in accordance with principles of the invention.

FIG. 24 shows a perspective view from above lamp 2300. Mounting support 2500 for lamp 2300 shown in FIG. 25 may be limited to a smaller diameter at the center of lamp 2300. Mounting support 2500 may have one or more features in common with mounting support 140 or mounting support 1930. Mounting support 2500 may differ from mounting support 140 and mounting support 1930.

Enclosure 2310 may include an upper surface 2400 that may be recessed below a top outer rim of lamp 2300. Lamp 2300 may include an outer sidewall 2402 that rises from the top of enclosure 2305 and provides clearance for a mounting support and its components. A raised central section 2410 of the upper surface 2400 of enclosure 2310 may have disposed thereon electrical connectors and stability connectors. Central section 2410 may be raised from the surface of enclosure 2305. Central section 2410 may be circular. Central section 2410 may rise from upper surface 2400 and may include a top 2415 of central section 2410. Top 2415 may be recessed downward from a top upper rim 2412 of central section 2410.

Enclosure 2310 may include a raised center chamber 2420 in the center of top 2415. Center chamber 2420 may include an outer wall 2426, a top surface 2428, and a chamfered surface therebetween.

Electrical connectors and stability connectors may be disposed on top of enclosure 1905 for engagement with a mounting support. The connectors may include two or more electrical connectors 2422, 2424 that may protrude from a top of raised center chamber 2420. The connectors may include two or more stability connectors 2430, 2432 that may protrude upward from top 2415 and may be disposed radially outward from electrical connectors 2422, 2424. Electrical connectors 2422, 2424 and stability connectors 2430, 2432 may be aligned in a row. The tops of electrical connectors 2422, 2424 may extend to a higher elevation than the elevation of tops of stability connectors 2430, 2432. The electrical connectors 2422, 2424 and the stability connectors 2430, 2432 may be the same, as shown. The electrical connectors 2422, 2424 and the stability connectors 2430, 2432 may be different from one another.

Electrical connectors 2422, 2424 may be configured to support a first weight when lamp 2300 is mounted to the surface. Stability connectors 2430, 2432 may be used in combination with electrical connectors 2422, 2424 to mount lamp 2300 to a mounting support to support a second weight of lamp 2300 that is greater than the first weight. Circuitry for lamp 2300 may be located within compartment 2440.

Figure 25:
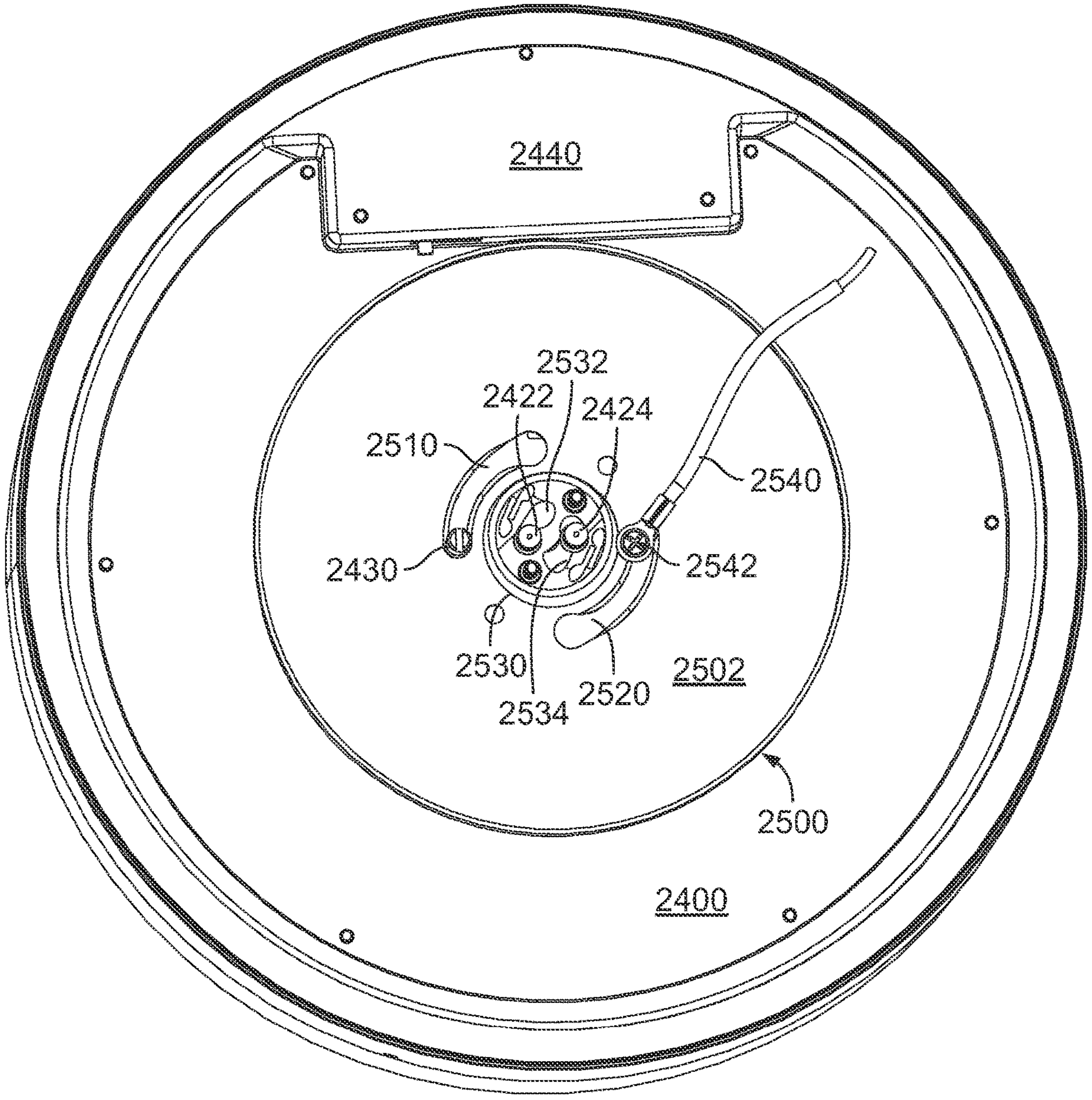
FIG. 25 shows a perspective view from above the illustrative canopy for illustrative lamp of FIG. 23 with connectors on the lamp engaged with receptacles in accordance with principles of the invention.

FIG. 25 shows lamp 2300 with connectors on the lamp engaged with receptacles on a portion of plate 2502 and hub 2530 of mounting support 2500. Receptacles may include respective arcuate slots 2532, 2534 on hub 2530. Electrical connectors 2422, 2424 may engage with respective arcuate slots 2532, 2534. Receptacles may include respective arcuate slots 2510, 2520 on plate 2502 of mounting support 2500. Stability connectors 2430, 2432 may engage with respective arcuate slots 2510, 2520. A grounding wire 2540 may be connected to mounting support 2500 to ground lamp 2300.

Figure 26:
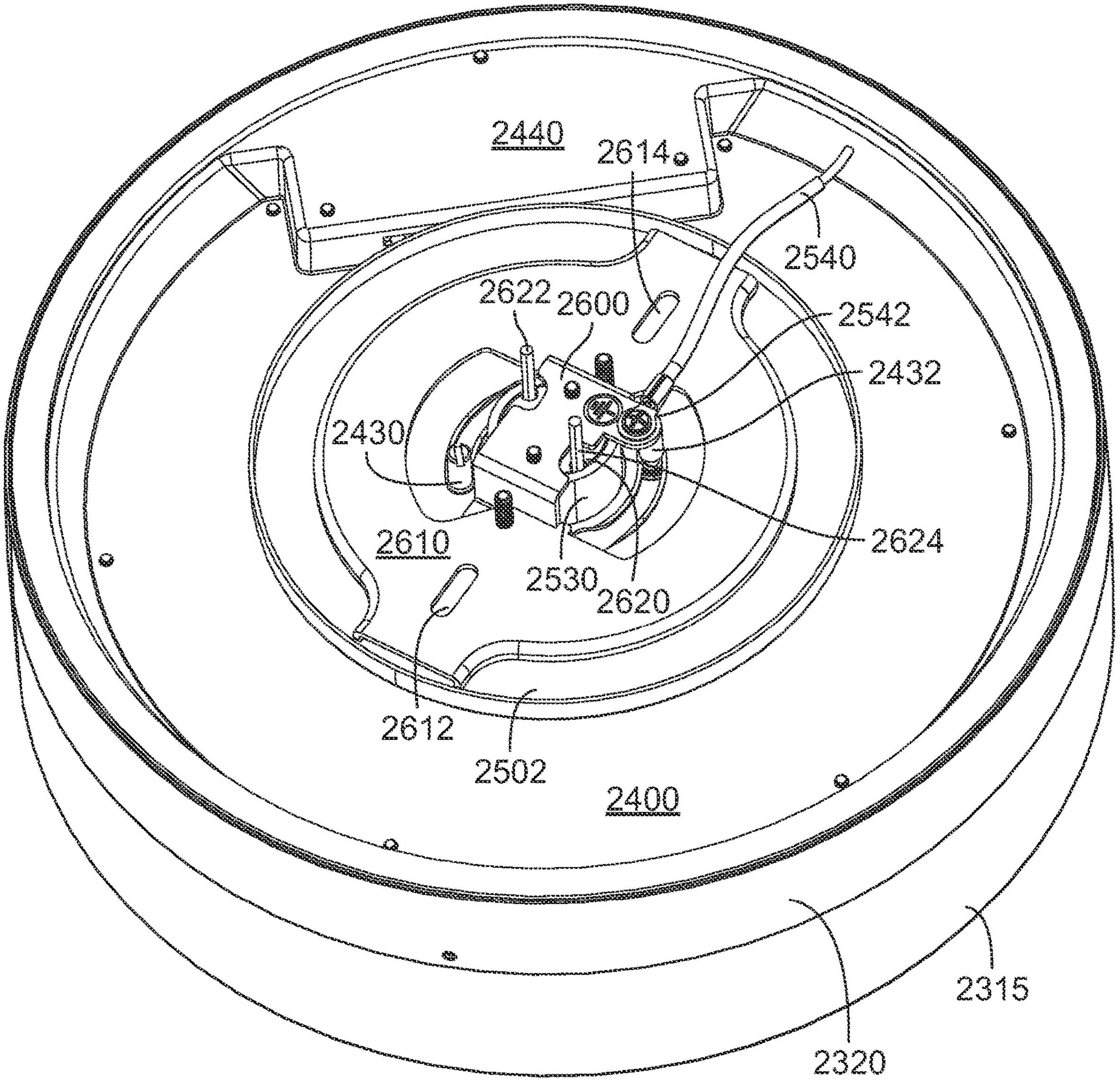
FIG. 26 shows a perspective view from above an illustrative mounting support with the illustrative lamp of FIG. 23 engaged therein in accordance with principles of the invention.

FIG. 26 shows a perspective view from above lamp 2300 with additional components of mounting support 2500 shown. Mounting support 2500 may include bracket 2600 positioned above hub 2530. Bracket 2600 may extend over electrical connectors 2422, 2424 and stability connectors 2430, 2432. Bracket 2600 may be connected to plate 2502 and may be connected to hub 2530 to assemble mounting support 2500. Located above and within plate 2502 may be a second plate 2610 that may provide additional rigidity of mounting support 2500 for reducing flexing of mounting support 2500. This may enable enclosure 2310 to more readily engage with mounting support 2500 without damaging or breaking connectors 2422, 2424, 2430, 2432. Lead wires 2622, 2624 may extend from a top 2620 of hub 2530 to be connected to wiring from an electrical junction box. Lead wires 2622, 2624 may make contact with power terminals in hub 2530 to contact electrical connectors 2422, 2424 and provide power to lamp 2300. Holes 2612, 2614 may be provided in second plate 2610 to connect second plate 2610 to bracket 2600.

Figure 27:
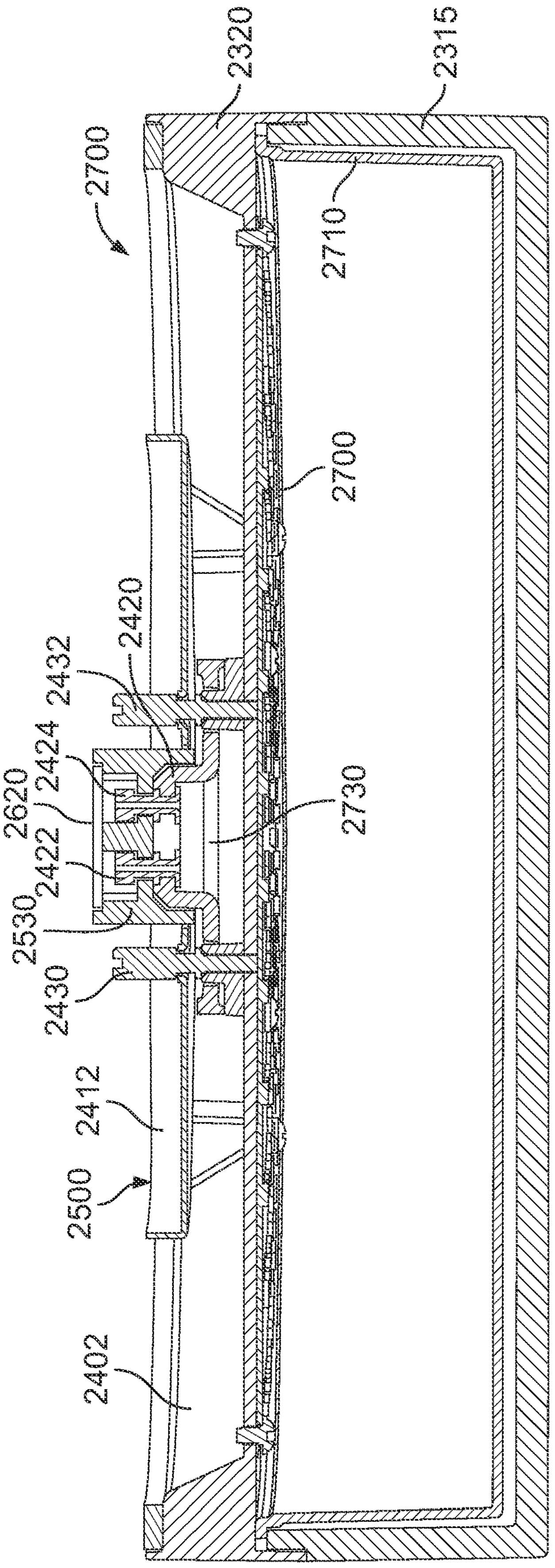
FIG. 27 shows a cross-section of the illustrative lamp of FIG. 23 connected to the illustrative mounting support in accordance with principles of the invention.

FIG. 27 shows a cross-section of lamp 2300 mounted to mounting support 2500. Lamp 2300 may include a light source 2700. Light source 2700 may include a circular array of light emitting diodes. A cover 2710 may be disposed below light source 2700. Cover 2710 may be frosted to provide diffusion to light emitted from light source 2700. Outer cover 2720, which may correspond to lower portion 2315 of lamp 2300, may be transparent or translucent. Enclosure 2310 may include an outer cover 2720 that may surround portions of cover 2710 to provide diffusion to light emitted from light source 2700. Outer cover 2720 may be transparent or translucent. Outer cover 2720 may be made, for example, from glass, plastic, or crystal.

Figure 28:
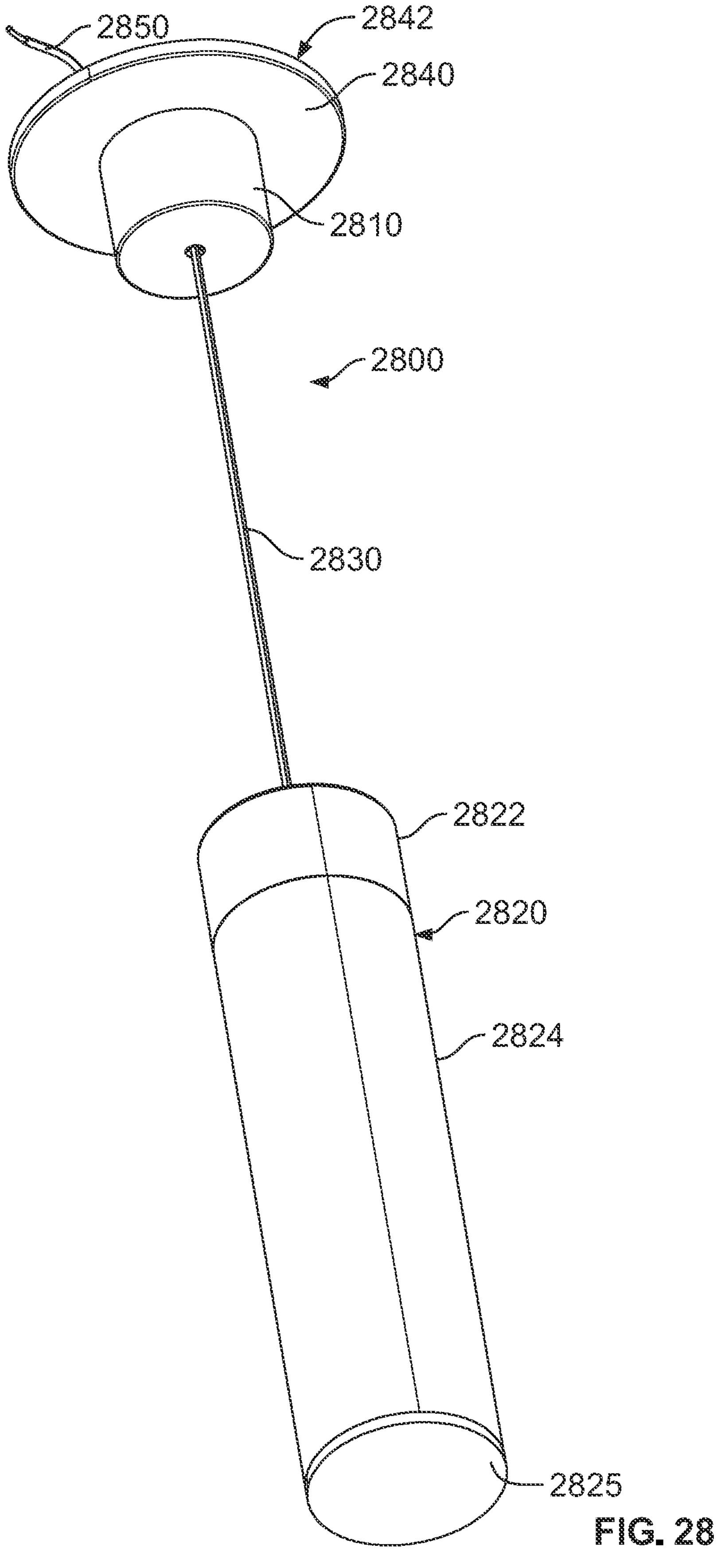
FIG. 28 shows a perspective view of another illustrative lamp connected to an illustrative canopy in accordance with principles of the invention.

FIG. 28 shows another embodiment of a lamp in accordance with principles of the invention.

Lamp 2800 may include a first enclosure 2810 and a second enclosure 2820. First enclosure 2810 and second enclosure 2820 may be connected with a cable 2830. Second enclosure 2820 may, in operation, be suspended from first enclosure 2810 when lamp 2800 is connected to a mounting support 2840 that is connected to a surface. Mounting support 2840 may have one or more features in common with one or more of mounting supports 140, 1930, 2500. Mounting support 2840 may differ from the other mounting supports.

First enclosure 2810 may include connectors to connect lamp 2800 to mounting support 2840. Mounting support 2840 may be connected to a grounding wire 2850 to ground lamp 2800. Second enclosure 2820 may include a light source. Second enclosure 2820 may include upper section 2822 where cable 2830 connects to second enclosure 2820. Second enclosure 2820 may include lower section 2824 that may house the light source. The bottom 2825 of second enclosure 2820 may be enclosed.

Figure 29:
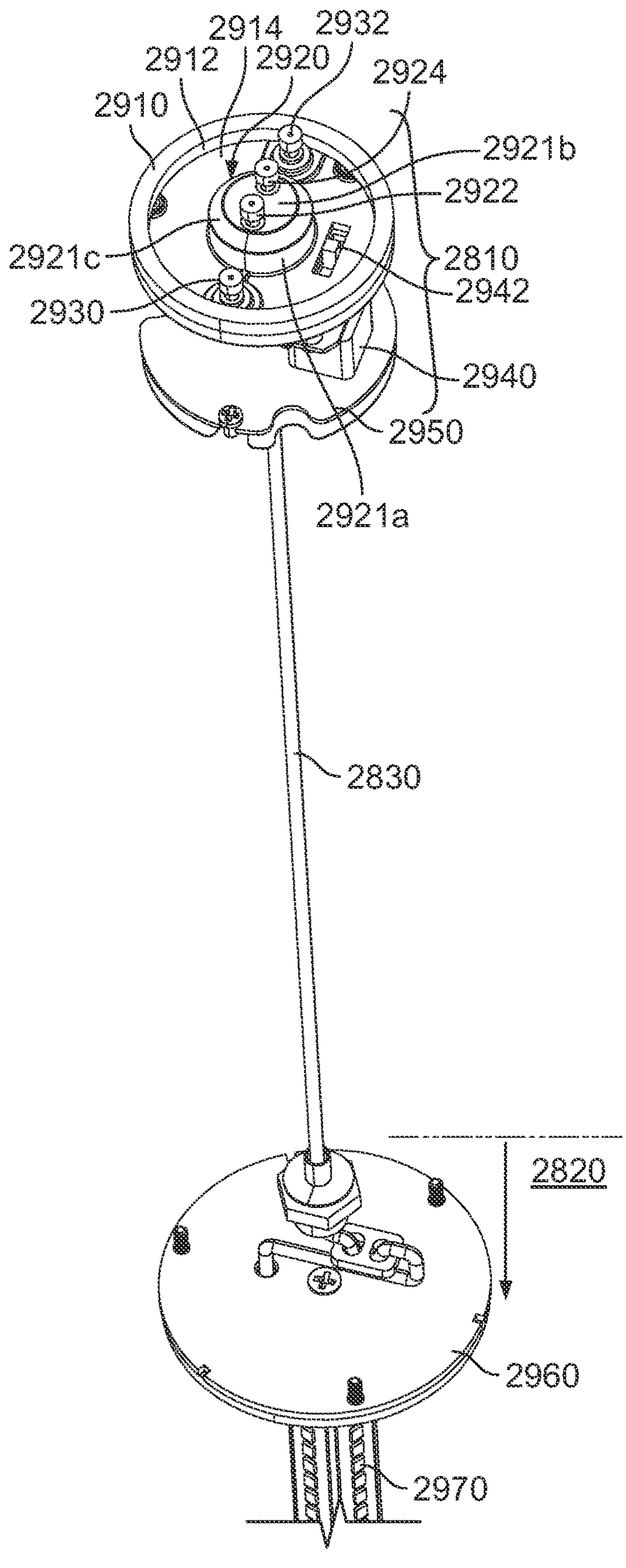
FIG. 29 shows a perspective view of the illustrative lamp of FIG. 28 with certain outer portions of the first and second enclosures removed in accordance with principles of the invention.

FIG. 29 shows a perspective view of lamp 2800 not connected to mounting support 2840 with outer walls of first enclosure 2810 and second enclosure 2820 removed. Upper enclosure 2810 may have a top surface with electrical and stability connectors that are similar to connectors in the lamp embodiments described above. Enclosure 2810 may include top surface 2914 that may be recessed below a top outer rim 2910 of lamp 2800.

Lamp 2800 may have a raised center chamber 2920 on a top surface of first enclosure 2810. Center chamber 2920 may include exterior wall 2921*a* that may surround a side of center chamber 2920, upper surface 2921*b*, and chamfered section 2921*c* between exterior wall 2921*a* and upper surface 2921*b*.

First enclosure 2810 may include two or more electrical connectors, such as electrical connectors 2922, 2924 protruding from the top of first enclosure 2810, such as from the top of center chamber 2920. In addition, two or more stability connectors 2930, 2932 may protrude from the top surface 2914 of enclosure 2810. Stability connectors 2930, 2932 may protrude upward from top surface 2914 and may be disposed radially outward from electrical connectors 2922, 2924. Electrical connectors 2922, 2924 and stability connectors 2930, 2932 may be aligned in a row. The tops of electrical connectors 2922, 2924 may extend to a higher elevation than the elevation of tops of stability connectors 2930, 2932. Stability connectors 2930, 2932 may have the same cross-section as electrical connectors 2922, 2924. Stability connectors 2930, 2932 may be different from electrical connectors 2922, 2924.

Electrical connectors 2922, 2924 may be configured to support a first weight when lamp 2800 is mounted to the surface. Stability connectors 2930, 2932 may be used in combination with electrical connectors 2922, 2924 to mount lamp 2800 to mounting support 2840 to support a second weight of lamp 2800 that is greater than the first weight.

A PCB 2940 may be located within first enclosure 2810. A control 2942 for controlling PCB 2940 may be accessible to an installer from a top of first enclosure 2810. First enclosure 2810 may also have a lower surface 2950 through which cable 2830 may pass.

Second enclosure 2820 may include a disc 2960 through which lead wires from a power source connect to the light source 2970. Light source 2970 may include an array of light emitting diodes. The array may be disposed on an elongated substrate.

Figure 30:
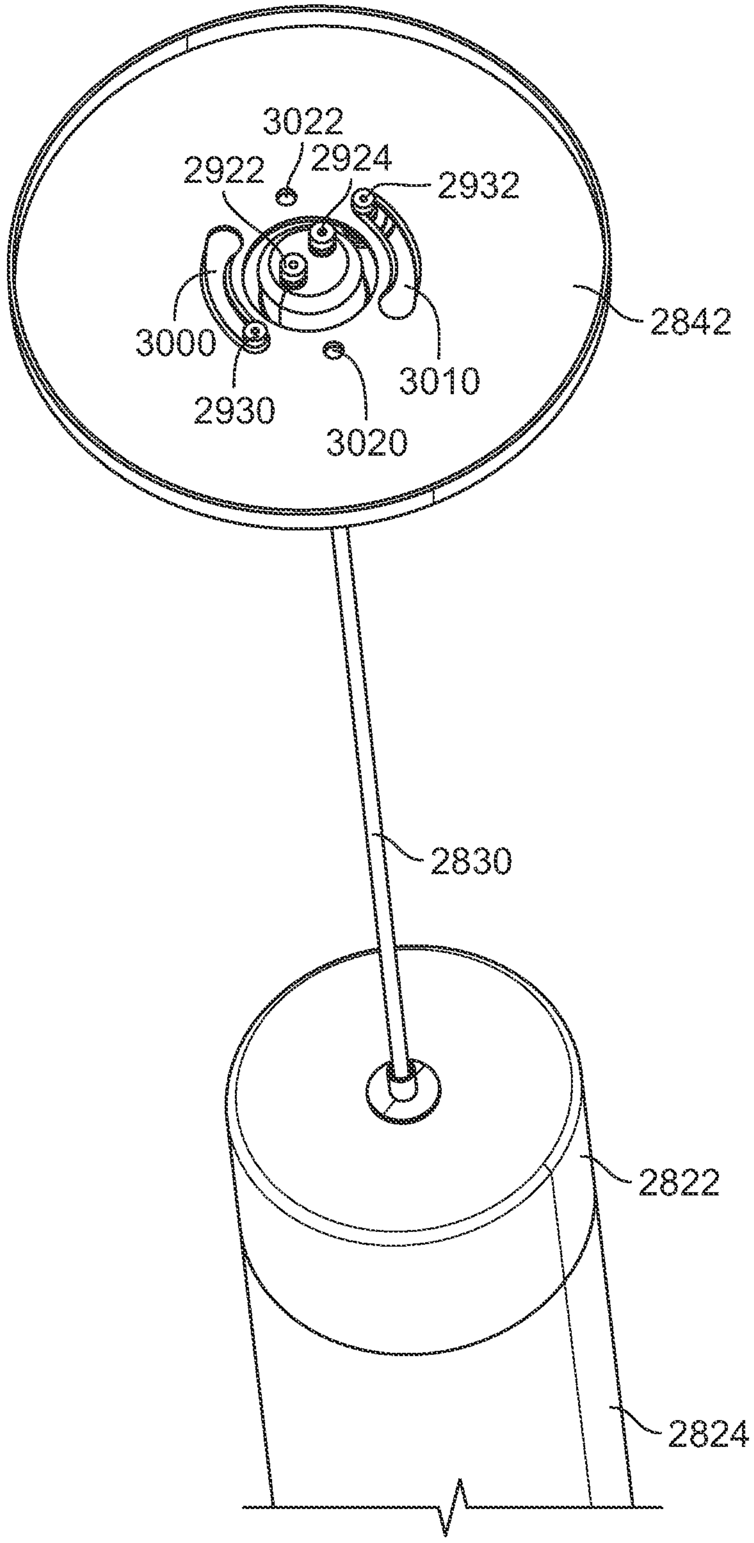
FIG. 30 shows a perspective view from above the illustrative canopy for illustrative lamp of FIG. 28 with connectors on the lamp engaged with receptacles in accordance with principles of the invention.

FIG. 30 shows a portion of plate 2842 of a mounting support to which lamp 2800 may be mounted. Plate 2842 may be part of a canopy. Plate 2842 may include receptacles to engage lamp 2800. Receptacles shown in FIG. 30 include arcuate slots 3000, 3010 for engaging stability connectors 2930 and 2932.

Figure 31:
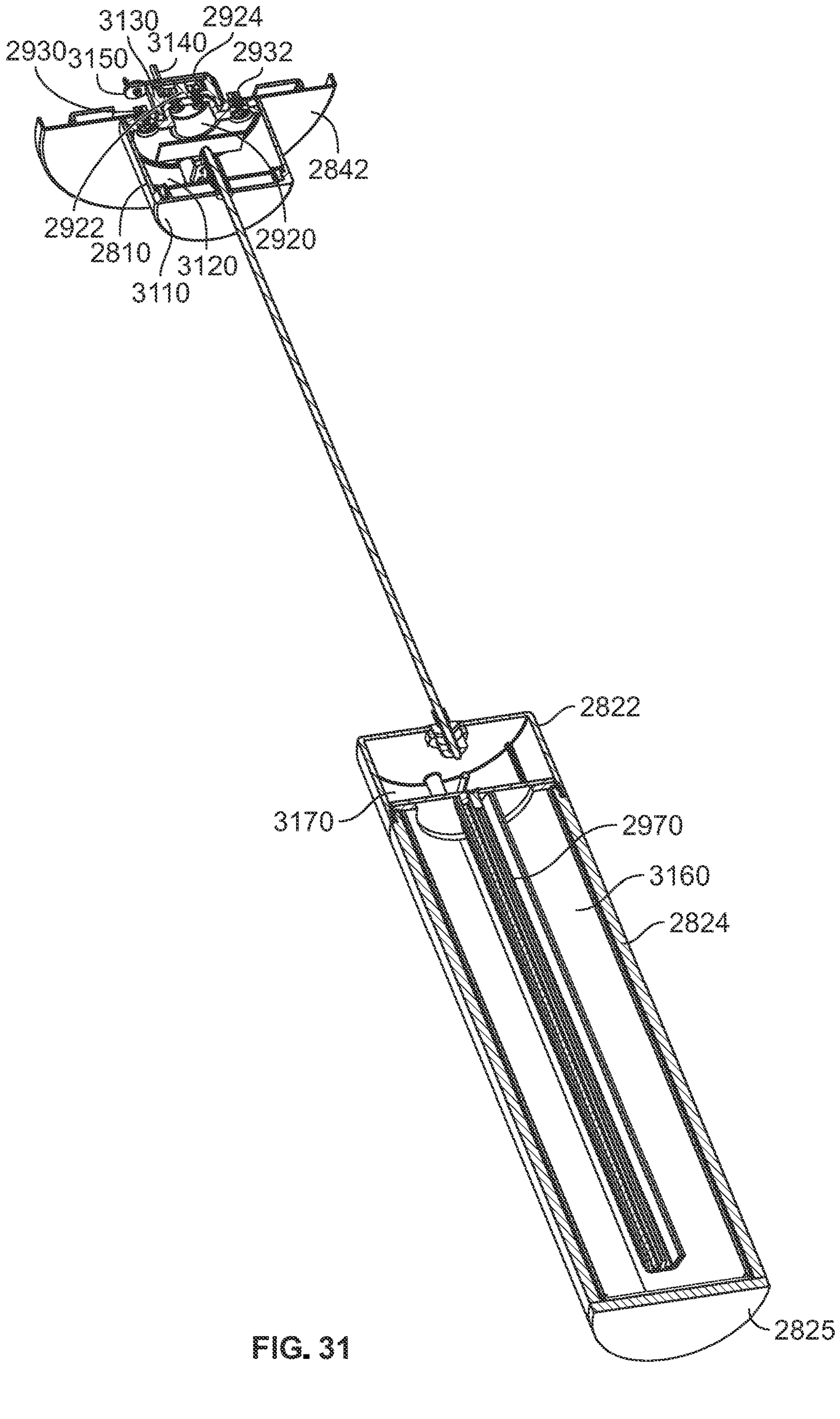
FIG. 31 shows a cutaway of the illustrative lamp of FIG. 28 from below connected to the illustrative mounting support in accordance with principles of the invention.

FIG. 31 shows a cutaway view of lamp 2800 mounted to mounting support 2840 with additional elements of mounting support 2840 shown. As in the above described embodiments, a hub 3130 may be provided as part of mounting support 2840 to connect to lamp 2800. Hub 3130 may include receptacles for the electrical connectors 2422, 2424. First enclosure 2810 may include a bottom 3110 and a space 3120 within first enclosure 2810. Second enclosure 2820 may include an inner cover 3160 that may surround light source 2970. Cover 3160 may be frosted to provide diffusion to light emitted from light source 2970. Outer cover 2720 may be transparent or translucent. Enclosure 2820 may include an outer cover 2824 that may surround portions of inner cover 3160. Outer cover 2824 may be transparent or translucent. Outer cover 2824 may be made, for example, of glass, plastic, or crystal.

Figure 32:
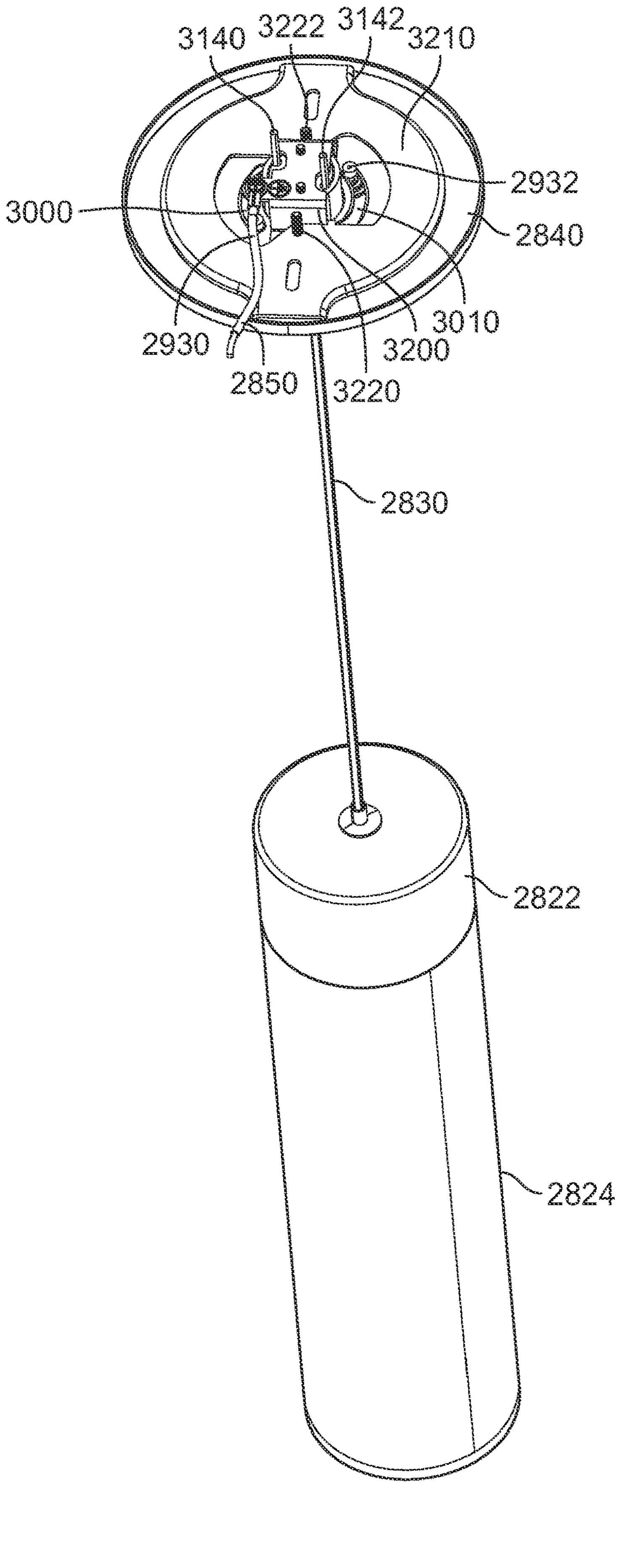
FIG. 32 shows a perspective view of the illustrative lamp of FIG. 28 from above connected to the illustrative mounting support in accordance with principles of the invention.

FIG. 32 shows a perspective view of the illustrative lamp of FIG. 28 from above connected to the illustrative mounting support. Mounting support 2840 may include a bracket 3200 positioned above hub 3130. Bracket 3200 may extend over electrical connectors 2922, 2924 and stability connectors 2930, 2932 and may be connected to plate 2842 and may be connected to hub 3130 to assemble mounting support 2840. Located above and within plate canopy may be second plate 3210 that may provide additional rigidity of mounting support 2840 and reduce flexing of mounting support 2840 when enclosure 2810 is mounted to mounting support 2840. This may enable enclosure 2810 to more readily engage with mounting support 2840 without damaging or breaking connectors 2922, 2924, 2930, 2932. Lead wires 3140, 3142 may extend from hub 3130 to be connected to wiring from an electrical junction box. Lead wires 3140, 3142 may make contact with power terminals in hub 3130 to contact electrical connectors 2922, 2924 and provide power to lamp 2800. Holes 2612, 2614 may be provided in second plate 2610 to connect second plate 2610 to bracket 2600.

The light source may be dimmable. For example, the light source may be dimmable to 1% of maximum illumination. The light source may be dimmable to 5% or 10%.

Embodiments may include features that are neither shown nor described in connection with the illustrative apparatus. Features of illustrative apparatus may be combined. For example, an illustrative embodiment may include features shown in connection with another illustrative embodiment. It is to be understood that structural, functional and procedural modifications or omissions may be made without departing from the scope and spirit of the present invention.

Apparatus and methods may involve the use of any suitable combination of elements, components, or method steps disclosed herein. Embodiments may include features that are neither shown nor described in connection with the illustrative apparatus. Features of illustrative apparatus may be combined. For example, an illustrative embodiment may include features shown in connection with another illustrative embodiment. It is to be understood that structural, functional, and procedural modifications or omissions may be made without departing from the scope and spirit of the present invention.

One of ordinary skill in the art will appreciate that the steps shown and described herein may be performed in other than the recited order and that one or more steps illustrated may be optional.

Thus, apparatus and methods for providing lighting through a connectable lamp have been provided. Persons skilled in the art will appreciate that the present invention may be practiced by other than the described embodiments, which are presented for purposes of illustration rather than of limitation.

What is claimed is:

1. A connectable lamp configured to be mounted to a surface, comprising:
- a light source;
- an enclosure that:
  - is configured to support the light source; and
  - defines a central axis;
- electrical connectors extending from the enclosure;
- stability connectors that:
  - extend from the enclosure; and
  - are disposed radially outward from the electrical connectors;
- a hub including power terminals; and
- a mounting support that:
  - is configured to be fixed to the surface; and
  - includes slots; and
- wherein:
  - the electrical connectors and the stability connectors are configured such that, after insertion of the electrical connectors and the stability connectors into the slots, rotation of the electrical connectors and the stability connectors about the central axis engages:
    - the electrical connectors with the power terminals; and
    - the stability connectors with the mounting support;
  - the electrical connectors extend to a first elevation above the enclosure;
  - the stability connectors extend to a second elevation above the enclosure;
  - the second elevation is, in operation, lower than the first elevation;
  - the electrical connectors are configured to extend into the hub;
  - the hub is configured to:
    - extend into an electrical junction box; and
    - be connectable to a power source via wiring from the electrical junction box.

2. The connectable lamp of claim 1 wherein the slots define first arcuate slots, each of which is configured to be removably engaged by a respective one of the electrical connectors.

3. The connectable lamp of claim 2 wherein the first arcuate slots are spring-loaded to removably retain the electrical connectors after the enclosure is rotated into engagement with the mounting support.

4. The connectable lamp of claim 2 wherein:
- the mounting support includes a plate;
- the slots define second arcuate slots in the plate; and
- each of the second arcuate slots is configured to receive and removably retain a respective one of the stability connectors.

5. The connectable lamp of claim 4 wherein the enclosure is configured to be mounted to the surface by:
- inserting:
  - the electrical connectors into the first arcuate slots; and
  - the stability connectors into the second arcuate slots; and
- rotating the enclosure so that:
  - the electrical connectors are retained in the first arcuate slots; and
  - the stability connectors are retained in the second arcuate slots.

6. The connectable lamp of claim 5 wherein the electrical connectors and the stability connectors are configured to be inserted into the first and second arcuate slots, respectively, at the same time.

7. The connectable lamp of claim 5 wherein the
- electrical connectors are configured to be inserted into the first arcuate slots and
- the stability connectors are configured to be inserted into the second arcuate slots after the electrical connectors are inserted into the second arcuate slots.

8. The connectable lamp of claim 4;
- wherein:
  - the plate is a first plate;
  - the mounting support includes a second plate mounted above the first plate; and
  - the second plate is configured to reduce flexing of the first plate when the enclosure is mounted to the mounting support.

9. The connectable lamp of claim 4 wherein the plate is configured as a canopy.

10. The connectable lamp of claim 1 wherein
- the electrical connectors are configured to support a first predetermined maximum weight of the connectable lamp when the connected lamp is mounted to the surface; and
- the stability connectors in combination with the electrical connectors are configured to support a second predetermined maximum weight of the connectable lamp that is greater than the first predetermined maximum weight.

11. The connectable lamp of claim 1 wherein the electrical connectors and the stability connectors are aligned in a row.

12. The connectable lamp of claim 1 wherein the stability connectors are spaced away from the electrical connectors across the central axis.

13. The connectable lamp of claim 1 wherein, when the lamp is operating, the stability connectors do not provide electrical power to the light source.

14. The connectable lamp of claim 1 wherein:
each of the electrical connectors defines a first longitudinal cross-sectional outline;
each of the stability connectors defines a second longitudinal cross-sectional outline; and
the first and second longitudinal cross-sectional outlines are the same.

15. The connectable lamp of claim 1 wherein the electrical connectors and the stability connectors are GU10 connectors.

16. The connectable lamp of claim 1 wherein the electrical connectors and the stability connectors are GU24 connectors.

17. The connectable lamp of claim 1 wherein:
each of the electrical connectors defines a first longitudinal cross-sectional outline;
each of the stability connectors defines a second longitudinal cross-sectional outline; and
the first and second longitudinal cross-sectional outlines are different.

18. The connectable lamp of claim 1 wherein the light source comprises a light emitting diode (LED) light source.

19. The connectable lamp of claim 1 wherein the light source is dimmable.

20. The connectable lamp of claim 1 wherein the connectable lamp is a downlight.

21. The connectable lamp of claim 20 wherein the light source is housed within the enclosure.

22. The connectable lamp of claim 21 further comprising a frosted cover that provides diffusion to light emitted from the light source in the lamp.

23. The connectable lamp of claim 22 further comprising a translucent cover;
wherein the frosted cover is disposed between the light source and the translucent cover.

24. The connectable lamp of claim 1
wherein:
the enclosure:
is configured to be mounted flush with the surface;
has:
a diameter that in operation is parallel to the surface; and
a depth that in operation extends away from the surface;
and
the diameter is greater than the depth.

25. The connectable lamp of claim 24 wherein the light source includes a circular array of light emitting diodes.

26. The connectable lamp of claim 1 wherein the light source is configured to be suspended from the enclosure by a cable that provides power to the light source.

27. The connectable lamp of claim 1 comprising, when the enclosure is a first enclosure, a second enclosure;
wherein:
the first enclosure is disposed, operationally, at a top of the lamp;
the top of the lamp is configured to be mounted to the surface; and
the second enclosure:
houses the light source;
is connected to the light source; and
is positionable at a position that is spaced apart from the first enclosure upon assembly.

28. The connectable lamp of claim 27 wherein the second enclosure is configured to be suspended from the first enclosure by a cable that provides power to the light source.

29. The connectable lamp of claim 27 further comprising an elongated substrate;
wherein:
the light source includes an array of light emitting diodes; and
the array is disposed on the elongated substrate.

* * * * *